United States Patent
Ouchi et al.

(10) Patent No.: US 10,492,047 B2
(45) Date of Patent: Nov. 26, 2019

(54) TERMINAL DEVICE, BASE STATION DEVICE, AND METHOD

(71) Applicant: Sharp Kabushiki Kaisha, Sakai, Osaka (JP)

(72) Inventors: Wataru Ouchi, Sakai (JP); Kazuyuki Shimezawa, Sakai (JP); Shohei Yamada, Sakai (JP); Takashi Hayashi, Sakai (JP); Yasuyuki Kato, Sakai (JP); Naoki Kusashima, Sakai (JP); Alvaro Ruiz Delgado, Sakai (JP); Kimihiko Imamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/546,430

(22) PCT Filed: Jan. 15, 2016

(86) PCT No.: PCT/JP2016/051170
§ 371 (c)(1),
(2) Date: Jul. 26, 2017

(87) PCT Pub. No.: WO2016/121537
PCT Pub. Date: Aug. 4, 2016

(65) Prior Publication Data
US 2018/0041857 A1 Feb. 8, 2018

(30) Foreign Application Priority Data

Jan. 28, 2015 (JP) .................................. 2015-014729

(51) Int. Cl.
*H04W 4/70* (2018.01)
*H04W 72/04* (2009.01)
(Continued)

(52) U.S. Cl.
CPC ............. *H04W 4/70* (2018.02); *H04L 5/0044* (2013.01); *H04W 8/24* (2013.01); *H04W 72/04* (2013.01); *H04W 72/12* (2013.01); *H04W 74/08* (2013.01)

(58) Field of Classification Search
CPC ........... H04W 4/70; H04W 4/04; H04W 8/24; H04W 72/04; H04W 72/12; H04W 74/08
See application file for complete search history.

(56) References Cited

U.S. PATENT DOCUMENTS 8,619,725 B2 * 12/2013 Ode ..................... H04B 7/024
370/331
2014/0169324 A1 * 6/2014 Seo ........................ H04L 5/001
370/329

(Continued)

FOREIGN PATENT DOCUMENTS

JP 2013-192039 A 9/2013

OTHER PUBLICATIONS

KDDI corporation, Discussion on simultaneous usage of the MTC enhancement functions, 3GPP TSG RAN WG1 Meeting #79 R1-144931, Nov. 17, 2014.

(Continued)

*Primary Examiner* — Jenee Holland
*Assistant Examiner* — Latresa A McCallum
(74) *Attorney, Agent, or Firm* — ScienBiziP, P.C.

(57) ABSTRACT

In order to perform efficient communications, provided is a terminal device configured to communicate with a base station device. The terminal device includes: a reception unit configured to receive a higher layer signal including a configuration relating to a physical uplink shared channel (PUSCH); a scrambling sequence generator configured to, if the terminal device supports a capability relating to low complexity and/or coverage enhancement, apply the same (Continued)

scrambling sequence to the PUSCH during a certain period; and a transmission unit configured to transmit the PUSCH, on the basis of the number of repetitions in the configuration relating to the PUSCH.

2 Claims, 4 Drawing Sheets

(51) Int. Cl.
*H04W 72/12* (2009.01)
*H04W 74/08* (2009.01)
*H04W 8/24* (2009.01)
*H04L 5/00* (2006.01)

(56) References Cited

U.S. PATENT DOCUMENTS

| 2015/0181576 | A1* | 6/2015 | Papasakellariou | H04L 5/0053 370/329 |
| 2015/0237649 | A1* | 8/2015 | Zhang | H04W 72/121 370/329 |
| 2015/0296518 | A1* | 10/2015 | Yi | H04L 1/08 370/336 |
| 2016/0057798 | A1* | 2/2016 | Chae | H04W 76/14 370/280 |
| 2016/0345119 | A1* | 11/2016 | Futaki | H04W 4/70 |

OTHER PUBLICATIONS

LG Electronics, UL channel transmission for MTC coverage enhancement, 3GPP TSG-RAN WG1 #76 R1-140308, Feb. 10, 2014.

LG Electronics, PRACH transmission for MTC coverage enhancement, 3GPP TSGRAN WG1 Meeting #76 R1-140304, Feb. 10, 2014.

Intel Corporation, "Coverage enhancement of PBCH for low cost MTC", R1-135103, 3GPP TSG RAN WG1 Meeting #75, San Francisco, USA, Nov. 11-15, 2013.

Intel Corporation, "PBCH coverage enhancement for low cost MTC", R1-134129, 3GPP TSG RAN WG1 Meeting #74bis, Guangzhou, China, Oct. 7-11, 2013.

\* cited by examiner

TERMINAL DEVICE, BASE STATION DEVICE, AND METHOD

TECHNICAL FIELD

Embodiments of the present invention relate to a technique for a terminal device, a base station device, and a method that enable efficient sharing of channel state information.

This application claims priority from Japanese Patent Application No. 2015-014729, filed in Japan on Jan. 28, 2015; the entire contents of which are incorporated herein by reference.

BACKGROUND ART

The 3rd General Partnership Project (3GPP), which is a standardization project has standardized the Evolved Universal Terrestrial Radio Access (EUTRA), in which high-speed communication is realized by adopting an orthogonal frequency division multiplexing (OFDM) communication scheme and flexible scheduling in a unit of prescribed frequency and time called a resource block. The overall communications that have employed the standardized EUTRA technology may be referred to as "Long Term Evolution (LIE) communications."

Moreover, the 3GPP discusses the Advanced EUTRA (A-EUTRA), which realizes higher-speed data transmission and has upper compatibility with the EUTRA. The EUTRA relates to a communication system based on a network in which base station devices have substantially the identical cell configuration (cell size); however, regarding the A-EUTRA, discussion is made on a communication system based on a network (heterogeneous wireless network, heterogeneous network) in which base station devices (cells) having different configurations coexist in the same area.

The 3GPP discusses machine type communication (MTC) performed by using a communication device (terminal device and/or base station device), which has low mobility or is stationary, other than a cellular phone such as a smart meter (NFL 1).

In NPL 1, when reducing the cost of the machine type communication, it may not be able to realize or may become difficult to realize functions that have been conventionally realized.

CITATION LIST

Non-Patent Document

[Non-Patent Document 1] NPL 1:R1-144931, KDDI corporation, 3GPP TSG RAN WG1 Meeting #79, 17-21 Nov. 2014.

DISCLOSURE OF THE INVENTION

Problems to be Solved by the Invention

When performing machine type communication, the conventional transmit power control method and transmission control method cannot be used as they are, because the machine type communication, may not include functions realizable by a conventional communication device (terminal device and/or base station device).

In light of the foregoing, an object of the present invention is to provide a terminal device, a base station device, and a method that enable efficient control of communication even in the machine type communication.

Means for Solving the Problems (1) In order to accomplish the object described above, the present invention is contrived to provide the following means. That is, a terminal device according to one aspect of the present invention is a terminal device configured to communicate with a base station device. The terminal device includes: a reception unit configured to receive a higher layer signal including a configuration relating to a physical uplink shared channel (PUSCH); a scrambling sequence generator configured to, when the terminal device supports a capability relating to low complexity and/or coverage enhancement, apply the same scrambling sequence to the PUSCH during a certain period; and a transmission unit configured to transmit the PUSCH on the basis of the number of repetitions in the configuration relating to the PUSCH.

(2) In addition, a base station device according to one aspect of the present invention is a base station device configured to communicate with a terminal device. The base station device includes a transmission unit, when the terminal device supports a capability relating to low complexity and/or coverage enhancement, configured to configure a parameter relating to the number of repetitions to each of configurations relating to a physical uplink shared channel, a physical uplink control channel, and a physical random access channel.

(3) In addition, a method according to one aspect of the present invention is a method of a terminal device configured to communicate with a base station device. The method includes the steps of: receiving a higher layer signal including a configuration relating to a physical uplink shared channel (PUSCH); applying, when the terminal device supports a capability relating to low complexity and/or coverage enhancement, the same scrambling sequence to the PUSCH during a certain period; and transmitting the PUSCH on the basis of the number of repetitions in the configuration relating to the PUSCH.

(4) Furthermore, a method according to one aspect of the present invention is a method of a base station device configured to communicate with a terminal device. The method includes the step of configuring, when the terminal device supports a capability relating to low complexity and/or coverage enhancement, a parameter relating to the number of repetitions to each of configurations relating to a physical uplink shared channel, a physical uplink control channel, and a physical random access channel.

Effects of the Invention

The present invention enables transmission efficiency to be improved in a radio communication system in which a base station device and a terminal device communicate.

MODE FOR CARRYING OUT THE INVENTION

First Embodiment

Figure 1:
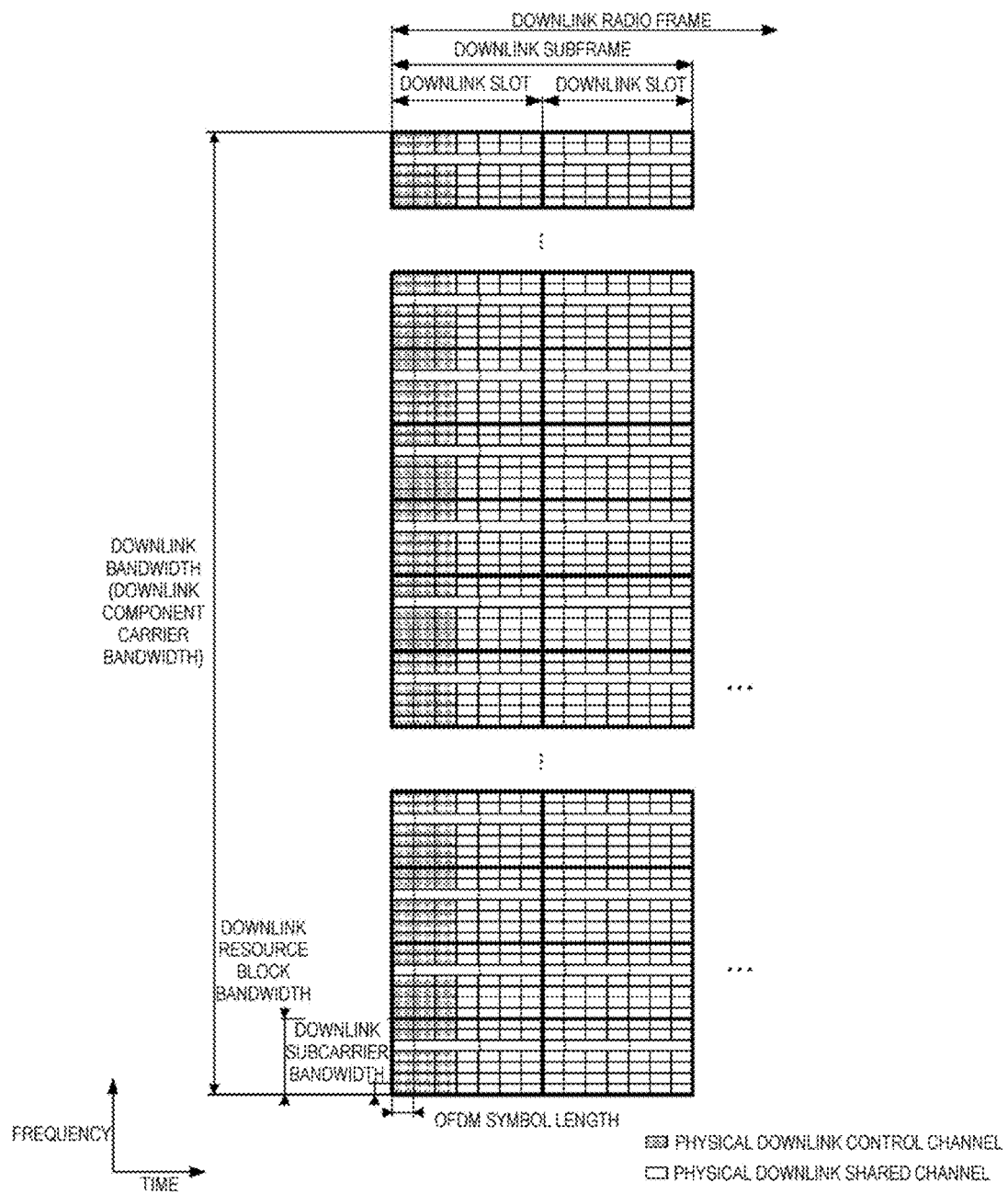
FIG. 1 is a diagram illustrating an example of a downlink radio frame configuration according to a first embodiment.

A first embodiment of the present invention will be described below. Description will be given by using a communication system in which a base station device (base station, NodeB, or EUTRAN NodeB (eNB)) and a terminal device (terminal, mobile station, user device, or user equipment (UE)) communicate in a cell.

Main physical channels and physical signals used in the EUTRA and the A-EUTRA will be described. The "channel" refers to a medium used to transmit a signal, and the "physical channel" refers to a physical medium used to transmit a signal. In the present embodiment the "physical channel" may be used as a synonym of "signal." In the future EUTRA and A-EUTRA, another physical channel may be added, the constitution or format of the existing physical channel may be changed, or another constitution or format may be added; however, the description of each embodiment of the present invention will not be affected even if such addition or change is performed.

In the EUTRA and the A-EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a certain frequency domain constituted of a set of multiple subcarriers (e.g., 12 subcarriers) on a frequency axis and a domain constituted of a certain transmission lime slot tone slot).

HD-FDD has two types: for type A HD-FDD operation, a guard period is created by a terminal device fey not receiving the last part (last symbol) of a downlink subframe immediately preceding an uplink sub frame from the same terminal device; and for type B HD-FDD operation, guard periods, each referred to as an HD guard sub frame, are created by a terminal device by not receiving a downlink subframe immediately preceding an uplink subframe front the same terminal device, and by not receiving a downlink subframe immediately following an uplink subframe from the same terminal device. That is, in the HD-FDD operation, a guard period is created by the terminal device controlling a reception process of the downlink subframe.

A frame structure type 2 is applicable to TDD. Each radio frame is constituted of two half-frames. Each half-frame is constituted of five subframes. A UL-DL configuration in a certain cell may vary among radio frames and the control of the subframe in uplink or downlink transmission may occur in the latest radio frame. The UL-DL configuration in the latest radio frame is acquirable via a PDCCH or higher layer signalling. Note that the UL-DL configuration indicates a constitution of uplink subframes, downlink subframes, and special subframe(s) in TDD. The special subframe is constituted of a DwPTS capable of downlink transmission, a guard period (GP), and a UpPTS capable of uplink transmission. The constitution of a DwPTS and a UpPTS in the special subframe are managed in a table, and the terminal device can acquire the constitution via higher layer signalling. Note that the special subframe server as a switch point from downlink to uplink.

In order to achieve reduced cost and low complexity (design/configuration with low complexity, simplified design configuration) of the machine type communication, the number or functions of each processing unit (transmission unit, reception unit, control unit, and the like) included in a communication device (terminal device and/or base station device, device, module) may be limited. For example, a radio frequency (RF) unit, an intermediate frequency (IF) unit, and a baseband unit are each provided as a single unit for the transmission unit and the reception unit. That is, the transmission unit and the reception unit may share those units. A bandwidth supported by a filter unit, a Single Carrier-Frequency Division Multiple Access (SC-FDMA) signal transmission unit/reception unit, an OFDM, signal transmission unit/reception unit, an uplink subframe generation unit, a downlink subframe generation unit, and the like provided in the transmission unit and the reception unit may be limited to, for example, 1.4 MHz. Moreover, the performance of an amplifier provided in the transmission unit and the reception unit is limited, which allows for lower power class/power value than that of the conventional transmission unit and the reception unit. That is, a communicable range (coverage) of the communication device enabling the machine type communication may be narrower than that of the conventional communication device. In addition, the number of antennas (antenna ports) included in the transmission unit and the reception unit may be limited. That is, a capability of Multiple Input Multiple Output (MIMO) may not be supported.

A terminal device used for machine type communications according to the present invention may be referred to as: "MTC terminal" or "low-complexity terminal (LC terminal)" in order to be differentiated from a terminal device such as a cellular phone. Note that, in the present invention, examples of the terminal device include an MTC terminal. Furthermore, the examples of the terminal device of the present invention may include an LC terminal. Furthermore, the examples of the terminal device of the present invention may include an enhanced coverage terminal (EC terminal). Furthermore, the communication device according to the present invention may be capable of supporting coverage enhancement to secure the communicable range or communication quality. That is, the terminal device of the present invention, may be referred to as "enhanced coverage terminal." Furthermore, the terminal device of the present invention may be referred, to as "low-complexity terminal." Furthermore, the MTC terminal may be referred to as "LC terminal" or "EC terminal." That is, examples of the MTC terminal may include the LC terminal and the EC terminal. However, the LC terminal and the LC terminal may be differentiated from each other, that is, the LC terminal and the EC terminal belong to different types-categories. A terminal that supports an LTE communication technology/service may be referred to as "LTE terminal." The MTC terminal is a kind of the LTE terminal; however, the MTC terminal is a terminal with reduced cost and low complexity as compared to the conventional LTE terminal. That is, the MTC terminal is an LTE terminal specialized/limited to a specific function. Here, the conventional LTE terminal is simply referred to as "LTE terminal."

The LC terminal corresponds to a low-end application (e.g., an application having low average sales per user, low data rate, and great delay tolerance), for example, the MTC. The LC terminal belongs to a terminal category 0, and has low performance for transmission and reception as compared to terminals belonging to other categories. The LC terminal may be referred to as "category 0 terminal."

Moreover, examples of the LC terminal basically include a low-end model terminal, whereas examples of the EC terminal may include both a low-end model terminal and a high-end model terminal. Functions relating to the EC may be used in terminals not only in category 0 but also in other categories.

The LC terminal may access only a cell indicated by an SIB in which access from the LC terminal is supported. If the cell does not support the LC terminal, the LC terminal determines that the cell is inaccessible.

The base station device determines, on the basis of a logical channel ID (LCID) for a common control channel (CCCH) and capability information (performance information) on the terminal device, that the terminal device is an LC device.

The S1 signalling has been extended to include terminal radio capability information for paging. When this paging-specific capability information is provided by the base station device to a mobility management entity (MME), the MME uses this information to indicate to the base station device that a paging request from the MME concerns the LC terminal.

In contrast, the EC terminal is intended for coverage enhancement and/or improvement in communication quality within the coverage. For example, it is assumed that the EC terminal performs communication at a place where communication environment is poor, such as a basement.

The capability information on the terminal device (UE radio access capability, UE EUTRA capability) initiates a procedure for the terminal device in a connected mode, when the base station device (EUTRAN) requires the capability information on the terminal device. The base station device inquires for the capability information on the terminal device, and transmits, in response to the inquiry, the capability information on the terminal device. The base station device determines if the capability information is supported. If the capability information is supported, the base station device transmits configuration information corresponding to the capability information via, for example, higher layer signalling to the terminal device. Upon the configuration information corresponding to the capability information being configured, the terminal device determines that transmission/reception based on the capabilities thereof can be performed.

FIG. 1 is a diagram illustrating an example of a downlink radio frame configuration according to the present embodiment. The downlink uses an OFDM access scheme. In the downlink, a physical downlink control channel (PDCCH), an enhanced physical downlink control channel (EPDCCH), a physical downlink shared channel (PDSCH), and the like are allocated. A downlink radio frame is constituted of downlink resource block (RB) pairs. The downlink RB pairs are each a unit for allocation of downlink radio resources and the like and is constituted of a frequency band of a predefined width (RB bandwidth) and a time duration (two slots equal to one subframe). Each of the downlink RB pairs is constituted of two downlink RBs (RB bandwidth×slot) that are contiguous in the time domain. Each of the downlink RBs is constituted of 12 subcarriers in the frequency domain. In the time domain, the downlink RB is constituted of seven OFDM symbols when a normal cyclic prefix (normal CP: NCP) is added, while the downlink RB is constituted of six OFDM symbols when a cyclic prefix that is longer than the normal cyclic prefix (extended CP: ECP) is added. A region defined by a single subcarrier in the frequency domain and a single OFDM symbol in the time domain is referred to as "resource element (RE)." The PDCCH/EPDCCH is a physical channel on which downlink control information (DCI) such as a terminal device identity, PDSCH scheduling information, PUSCH scheduling information, a modulation scheme, a coding rate, and a retransmission parameter is transmitted. Note that although a downlink subframe in a single component earner (CC) is described here, a downlink subframe is defined for each CC and downlink subframes are substantially synchronized between the CCs.

A synchronization signal (SS), a physical broadcast channel (PBCH), and a downlink reference signal (DLRS) may be allocated in the downlink subframes (not illustrated). Examples of the DLRS include a cell-specific reference signal (CRS) a channel state information reference signal (CSI-RS), a user equipment-specific reference signal (UERS), and a demodulation reference signal (DMRS). The CRS is transmitted through the same antenna port (transmit port) as that for PDCCH, the CSI-RS is used to measure channel state information (CSI), the UERS is transmitted through the same antenna port as that for some PDSCHs, and the DMRS is transmitted through the same transmit port as that for EPDCCH. Moreover, carriers on which no CRS is mapped may be used. In this case, a similar signal preferred to as "enhanced synchronization signal") to a signal corresponding to some antenna ports (e.g., only antenna port 0) or all the antenna ports tor the CRS can be inserted into some subframes (e.g., the first and sixth subframes in the radio frame) as time and or frequency tracking signals. Here, an antenna port may be referred to as "transmit port." Here, the term "physical channel/physical signal is transmitted through an antenna port" includes a meaning that a physical channel/physical signal is transmitted via a radio resource or layer corresponding to the antenna port. For example, the reception unit is intended to receive a physical channel or physical signal via a radio resource or layer corresponding to the antenna port.

Figure 2:
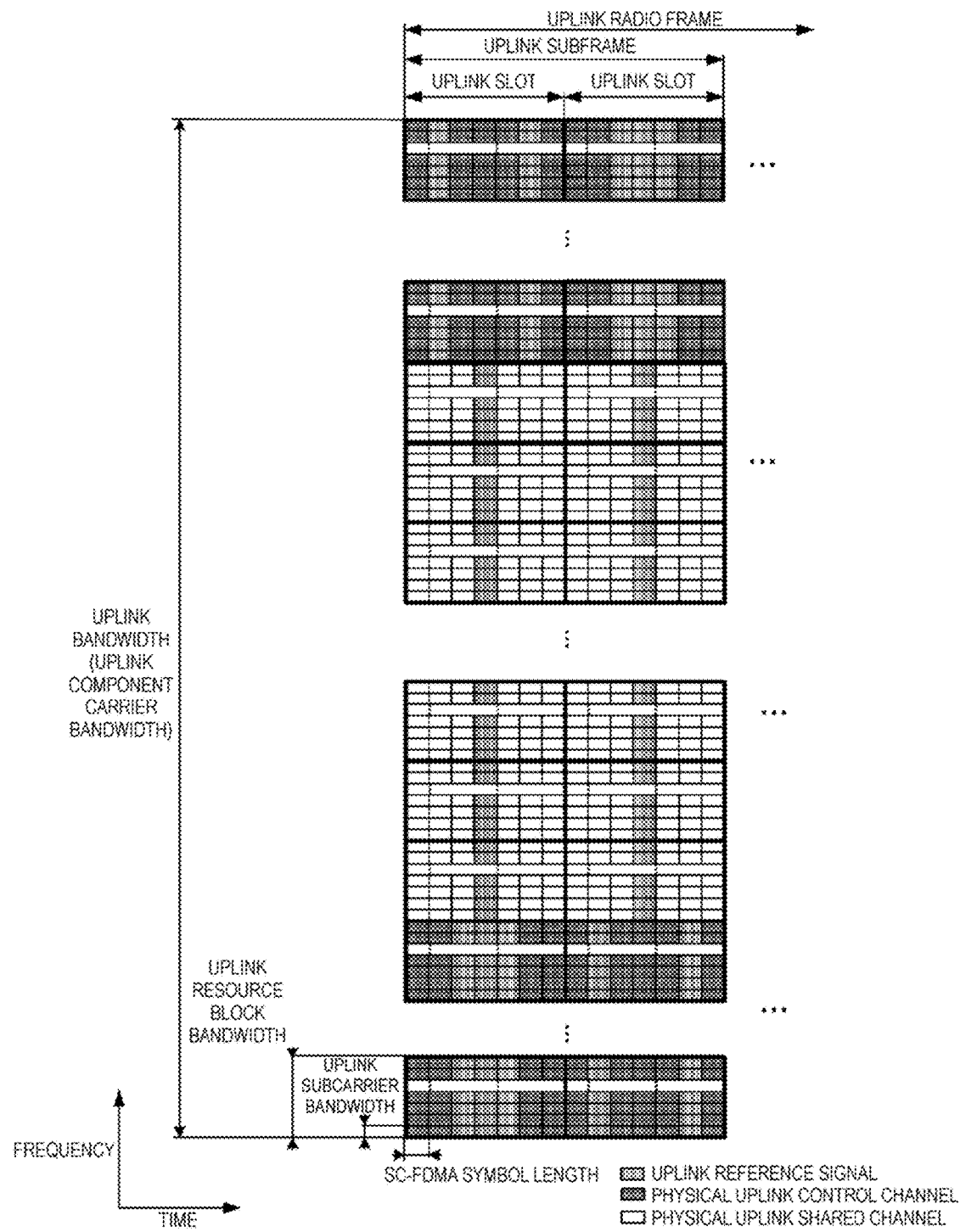
FIG. 2 is a diagram illustrating an example of an uplink radio frame configuration according to tire first embodiment.

FIG. 2 is a diagram illustrating an example of an uplink radio frame configuration according to the present embodiment. The uplink uses an SC-FDMA scheme. In the uplink, a physical uplink shared channel (PUSCH), a physical uplink control, channel (PUCCH), and the like are allocated. An uplink reference signal is also allocated together with the PUSCH and the PUCCH. An uplink radio frame is constituted of uplink RB pairs. The uplink RB pairs are each a unit for allocation of unlink radio resources and the like and is constituted of a frequency domain of a predefined width (RB bandwidth) and a time domain (two slots equal to one subframe). Each of the uplink RB pairs is constituted of two uplink RBs (RB bandwidth×slot) that are contiguous in the time domain. Each of the uplink RB is constituted of 12 subcarriers in the frequency domain. In the time domain, the uplink RB is constituted of seven SC-FDMA symbols when a normal cyclic prefix (Normal CP) is added, while the uplink RB is constituted of six SC-FDMA symbols when a cyclic prefix that is longer than the normal cyclic prefix (Extended CP) is added. Note that although an uplink subframe in a single CC is described here, an uplink subframe is defined for each CC.

A synchronization signal is constituted of one of three types of primary synchronization signals (PSSs) and a secondary synchronization signal (SSS) constituted of 31 types of codes that are interleaved in the frequency domain. 504 patterns of cell identities (physical cell IDs (PCIs)) for identifying base station devices, and frame tinning for radio synchronization are indicated by the combinations of the PSS and the SSS. The terminal device identifies the physical cell ID in a synchronization signal received by cell search.

The physical broadcast channel (PBCH) is used to notify (configure) control parameters (broadcast information, system information (SI)) that are commonly used among terminal devices in a cell. The terminal devices in the cell are notified, on the PDCCH, of the radio resource in which broadcast information is transmitted. Broadcast information not notified on the PBCH is transmitted, as a layer-3 message (system information) tor making notification of the broadcast information on the PDSCH, in the notified radio resource. The TTI (repetition rate) of PBCH to which a broadcast channel (BCH) is mapped is 40 ms.

The PBCH is allocated with six RBs at the center of transmission bandwidth (i.e., 72 REs). Furthermore, the PBCH is transmitted in four contiguous radio frames that start from a radio frame satisfying radio frame number (SFN) mod 4=0. A scramble sequence of PBCH is initialized with the PCI in each radio frame satisfying radio frame number (SFN) mod 4=0. The number of antenna ports for PBCH is the same as the number of antenna ports for CRS. The PDSCH is not transmitted in resources which have the PBCH or CRS allocated (mapped) thereto. That is, the terminal device does not expect that the PDSCH is mapped to the same resource as that for the PBCH or CRS. In addition, the base station device does not map the PDSCH to the same resource as that for the PBCH or CRS.

The PBCH is used to broadcast system, control information (master information block (MIB)).

The MIB includes system information transmitted on a BCH. For example, the system information included in the MIB includes downlink transmission bandwidth, PHICH configuration, and a system frame number. The MIB also includes spare bits (bit sequence) of 10-bit length. Note that the downlink transmission bandwidth may be included in mobility control information. The mobility control information may be included in information on RRC connection reconfiguration. That is, the downlink transmission bandwidth may be configured via an RRC message higher laser signalling.

System information to be transmitted in a form other than the MIB is transmitted in a system information block (SIB). A system information message (SI message) is used to transmit one or more SIBs. All the SIBs included in the SI message are transmitted at the some intervals. Furthermore, all the SIBs are transmitted on a downlink shared channel (DL-SCH). Note that the DL-SCH may be referred to as "DL-SCH data" or "DL-SCH transport block."

The resource allocation for a PDSCH, on which the DL-SCH having an SI message mapped thereto is transmitted, is indicated by a PDCCH involving CRC scrambled with an SI-RNTI.

The resource allocation for a PDSCH, on which the DL-SCH having information on a random access response mapped thereto is transmitted, is indicated by a PDCCH involving CRC scrambled with an RA-RNTI.

The resource al location for a PDSCH, on which a PCH having a paging message mapped thereon is transmitted, is indicated by a PDCCH involving CRC scrambled with a P-RNTI. Note that the PCH may be referred to as "PCH data" or "PCH transport block."

The SIB has, for each type, different system information that is transmittable. That is, different information is indicated for each type.

For example, a system information block type 1 (SIB 1) includes information associated with estimation (evaluation, measurement) when the terminal device attempts to access a certain cell and defines scheduling for other system information. For example, the SIB 1 includes: information associated with cell access such as a PLMN identity list, a cell identity, and a CSG identity; cell selection information; a maximum power value (P-Max); a frequency band indicator; an SI-window length; periodicity of an SI message; a TDD configuration, and the like.

Upon receiving the SIB 1 through broadcast or dedicated signalling, if the terminal device is in an idle mode or connected mode while T311 is in operation, the terminal device is a category 0 terminal, and information, indicating that the category 0 terminal is allowed to access a cell (category0Allowed), is not included in the SIB 1, then the terminal device determines that access to a cell is prohibited. That is, if the SIB 1 indicates that the category 0 terminal is not allowed to access a cell, the category 0 terminal cannot access the cell.

For example, a system information block type 2 (SIB 2) includes radio resource configuration information that is common for all the terminal devices. For example, the SIB 2 includes frequency information such as an uplink carrier frequency and uplink bandwidth, information on a time adjusting timer, and the like. The SIB 2 further includes information on configuration for a physical channel/physical signal, such as a PDSCH and a PRACH, an SRS, and an uplink CP length. The SIB 2 further includes information on configuration tor signalling of higher layers such as RACH and BCCH.

For example, a system, information block type 3 (SIB 3) includes information common for infra-frequency cell re-selection, inter-frequency cell re-selection, and inter-radio access technology (RAT) cell re-selection.

Although 17 types of SIBs have been provided, a new one may be added/defined according to use thereof.

The SI message includes an SIB other than the SIB 1.

When information on the configuration of the PDCCH for the MTC terminal is included in a received MIB, the MTC terminal receives, in accordance with the information, the PDCCH for the MTC terminal. The information may include a resource block index (frequency position) corresponding to a transmission bandwidth where the PDCCH for the MTC terminal is allocated. Furthermore, the information may include an index indicating a starting position (start position, start symbol) of the OFDM symbol in which the PDCCH for the MTC terminal is allocated. Furthermore, the information may include the number of OFDM symbols required for the PDCCH for the MTC terminal. Note that such information may be provided to the MIC terminal or updated, via other SIBs or dedicated signalling.

On the PBCH, a coded BCH transport block is mapped to four subframes within a 40 ms interval. A 40-ms timing for the PBCH is blindly detected. That is, there is no explicit signalling indicating the 40-ms timing. Each subframe is assumed to be self-decodable. That is, the BCH can be decoded from a single reception, assuming sufficiently good channel conditions.

The MIB (or PBCH) uses a fixed schedule with a periodicity of 40 ms and repetitions made within 40 ms. The first transmission of the MIB is scheduled in subframe #0 of radio frames that satisfy SFN mod 4=0, and the repetitions are scheduled in subframe #0 of all other radio frames. Note that the SFN denotes a radio frame number.

When the terminal device informs the base station deuce (PLMN, EUTRA), through capability information, that the terminal device has a capability for the MTC (a capability, for low Mobility (LC), a capability for Enhanced Coverage (EC)) and the base station device allows for access from the MTC terminal (or has a cell to which access from the MTC terminal is allowed), the base station device may set, to MIB spare bits, information/parameter on configurations of physical channnels, such as PDCCH/EPDCCH, PDSCH, PHICH, and PBCH, for the MTC terminal, and transmit the MIB. Note that the base station device may provide the MTC terminal with an accessible cell via higher layer signalling. The base station device may cause the transmission of the MIB (PBCH) for the MTC terminal to be repeatedly performed at shorter intervals, in addition to the transmission via the above-described subframe and radio frame. For example, the PBCH for the MTC terminal may be transmitted in an MBSFN subframe. Furthermore, the MIB for the MTC terminal may be transmitted in a subframe during a measurement gap. In the MTC terminal, a configuration may be employed in which reception is more frequently repeated to improve the accuracy thereof. For such a PBCH, it is not preferable that a scrambling sequence generator be initialized with an initial value (parameter) in the middle of repeated transmission or repeated reception, and thus, the scrambling sequence generator for the PBCH may be initialized at longer intervals. That is, although the number of PBCH receptions corresponding to the MIB is increased, a timing at which the scrambling sequence generator is initialized may be adjusted in accordance with the number of repetitions.

During the repeated transmission (repeated transmission period), a terminal device not supporting simultaneous transmission reception does not expect itself to be able to receive a downlink signal in a downlink subframe or a special subframe.

During the repeated reception (repeated reception period), a terminal device not supporting simultaneous transmission/reception does not expect itself to be able to transmit an uplink signal in the uplink subframe or special subframe.

When information oil configurations of the PBCH for the MTC terminal is set to MIB spare bits, the MTC terminal can monitor the PBCH for the MTC terminal, in accordance with the configurations. System information transmitted on this PBCH may include information on configurations of a PHICH/Enhanced PHICH (EPHICH) for the MTC terminal and information on configurations of other physical channels, a carrier frequency for the MTC terminal, a downlink transmission bandwidth and/or uplink transmission bandwidth for the MTC terminal, and the like. This configuration allows the base station device to perform scheduling such that radio resources for an LTE terminal are not allocated for the MTC terminal. That is, the base station device may perform scheduling such that FDM is performed in the MTC terminal and the LTE terminal.

Information, indicating whether or not configurations of various physical channels for the MTC terminal are set in an SIB and an RRC message, may fee set to the MIB spare bits. For example, when the configuration of a PDCCH/EPDCCH for the MTC terminal is set in an SIB and an RRC message, a value of the spare bit corresponding to the configuration is set to "1." When the configuration of a PDCCH/EPDCCH for the MTC terminal is not set in an SIB or an RRC message, the value of the spare bit corresponding to the configuration is set to "0." Similarly, when the configuration oi a PDSCH for she MTC terminal is set in an SIB and an RRC message, a value oi the spare bit corresponding to the configuration is set to "1." When the configuration of a PDSCH for the MTC terminal is not set in an SIB or an RRC message, the value of the spare bit corresponding to the configuration is set to "0." A PBCH (BCCH), a PHICH, a PRACH (RACH), a PUSCH, a PUCCH, a paging control channel (PCCH), a CCCH and the like may be indicated in the similar manner. She MTC terminal may read values of bits corresponding to configuration information, acquire the configuration information from the corresponding SIB or RRC message, and transmit or receive the corresponding signal.

Allocation information on radio resources, such as resource configuration, subframe configuration, a transmission bandwidth, and a starting symbol, to which the MTC terminal is allowed to access, may be set to the MIB spare bits. In accordance with the information, the MTC terminal can receive a PBCH (second PBCH) and a PDCCH (second PDCCH or EPDCCH) for the MTC terminal. A PHICH configuration corresponding to the PDCCH may be set to the system information corresponding to the PBCH. Values of various RNTIs may be set to the system information. When the CRC of the PDCCH is scrambled with an SI-RNTI, system information corresponding to the MTC terminal can be received via the PDSCH (DL-SCH) corresponding to the PDCCH. The MTC terminal can acquire, in accordance with the system information, information on configurations of various physical channels physical signals for the MTC terminal. Information on these configurations may include the number of repetitions. Furthermore, the information on these configurations may include information on a power class. Furthermore, the information on these configurations may include each RNTI value.

In the system information on the second PBCH, a downlink transmission bandwidth for the MTC terminal and a starting symbol of the second PDCCH/EPDCCH may be indicated. The MTC terminal can receive the second PDCCH/EPDCCH in accordance with the downlink transmission bandwidth and the starting symbol. Furthermore, when the second PDCCH/EPDCCH includes CRC scrambled with an SI-RNTI, an SIB (SI message) for the MTC terminal tan He detected. The information on the configurations of a physical channel physical signal that are indicated in the SIB corresponds to a physical channel/physical signal for the MTC terminal. The MTC terminal can transmit and receive a physical channel/physical signal in accordance with the configured information. When the second PDCCH/EPDCCH includes CRC scrambled with a P-RNTI, a PCH for the MTC terminal can be detected. Note that in such a case, the SI-RNTI and the P-RNTI may be prescribed values.

As described above, the base station device sets the configuration information for the MTC terminal to the MIB spare bits, which allows the information on configurations of various physical channels/physical signals for the MTC terminal to be configured via radio resources different from those for the LTE terminal.

The SIB 1 uses a fixed schedule with a periodicity of 80 ms and repetitions made within 80 ms. The first transmission of the SIB 1 is scheduled in subframe #5 of radio frames that satisfy SFN mod 8=0, and the repetitions are scheduled in subframe #5 of all other radio frames that satisfy SFN mod 2=0.

The SI message is transmitted within periodically occurring time domain windows (SI-windows) using dynamic scheduling (PDCCH scheduling, a PDCCH involing CRC scrambled with a system information radio network temporary identifier (SI-RNTI)). Each SI message is associated with an SI-window, and the SI-windows of different SI messages do not overlap. Within one SI-window, only the corresponding SI is transmitted. The length of the SI-window is common for all SI-messages and is configurable.

Within the SI-window, the corresponding SI message can be transmitted a number of tunes in any subframe other than multimedia broadcast multicast service single frequency network (MBSFN) subframes, uplink sub frames in TDD, and subframe #5 of radio frames that satisfy SFN mod 2=0. The terminal device acquires the detailed time-domain scheduling (and other information, e.g. frequency-domain scheduling, used transport format) from decoding SI-RNTI on PDCCH. Note that the SI message includes a SIB other than the SIB 1.

When the terminal device informs the base station device (PLMN, EUTRA), through capability information, that the terminal device has a capability for the MTC (a capability for Low Mobility (LC), a capability for Enhanced Coverage (EC)) and the base station device allows for access from the MTC terminal (or has a cell to which access from the MTC terminal is allowed), the base station device may set, to the SIB (either the SIB 1 or the SI message), information/parameter on configurations of physical channels, such as PDCCH/EPDCCH, PDSCH, and PHICH, for the MTC terminal, and transmit the SIB. The base station device may cause the transmission of the SIB (an SIB 1, an SI message, a new SIB type) for the MTC terminal to be repeatedly performed at shorter intervals, in addition to the transmission via the above-described subframe and radio frame. For example, the SIB for the MTC terminal may be transmitted in an MBSFN subframe. Furthermore, the SIB for the MTC terminal may be transmitted in a subframe during a measurement gap. In the MTC terminal, a configuration may be employed in which reception is more frequently repeated to improve the accuracy thereof. For such PDCCH and PDSCH corresponding to the SIB, it is not preferable that a scrambling sequence generator be initialized on the basis of an initial value (parameter) in the middle of repeated transmission or repeated reception, and thus, a scrambling sequence generator for the PDCCH and PDSCH may be initialized at longer intervals. That is, although the number of receptions of PPCCH and PDSCH corresponding to the SIB is increased, a timing at which the scrambling sequence generator is initialized with the initial value may be adjusted in accordance with the number of repetitions.

For example, when the terminal deuce is capable of repeated reception of a downlink signal and the base station device is capable of repeated transmission of a downlink signal, a generator of a scrambling sequence or a pseudo-random sequence used for a downlink signal may be initialized at a timing different from the conventional timing. Furthermore, an initial value (parameter) used to initialize the generator of the scrambling sequence or the pseudo-random sequence used for a downlink signal may be configured with higher layer signalling, system information, or the MIB. For example, an initial value used to initialized the generator is determined on the basis of a PCI, a slot number, and the like; however, the initial value may be determined via a higher layer parameter or a prescribed value (e.g., an RNTI value) that is different from the PCI, the slot number, and the like.

For example, when the terminal device is capable of repeated transmission of an uplink signal and the base station device is capable of repeated reception of an uplink signal, a generator of a scrambling sequence or a pseudo-random sequence used for an uplink signal may be Initialized, at a timing different from the conventional timing. Furthermore, an initial value (parameter) used to initialize the generator of the scrambling sequence or the pseudo-random sequence used for an uplink signal may be configured with higher layer signalling, system information, or the MIB. For example, an initial value used to initialize the generator Is determined on the basis of a PCI, a slot number, and/or the like; however, the initial value may be determined via a higher layer parameter or a prescribed value (e.g., an RNTI value) that is different from the PCI, the slot number, and/or the like.

Examples of the RNTI used to scramble CRC include RA-RNTI, C-RNTI, SPS C-RNTI, temporary C-RNTI, eIMTA-RNTI, TPC-PUCCH-RNTI, TPC-PUSCH-RNTI, M-RNTI, P-RNTI, and SI-RNTI. The RA-RNTI, C-RNTI, SPS C-RNTI, eIMTA-RNTI, TPC-PUCCH-RNTI, and TPC-PUSCH-RNTI are configured via higher layer signalling. The M-RNTI, P-RNTI, and SI-RNTI correspond to a single value. For example, the P-RNTI corresponds to a PCH and a PCCH and is used to make notification of changes in paging and system information. The SI-RNTI corresponds to a DL-SCH and a BCCH, and is used to broadcast system information. The RA-RNTI corresponds to a DL-SCH, and is used for a random access response. The RA-RNTI, C-RNTI, SPS C-RNTI, temporary C-RNTI, eIMTA-RNTI, TPC-PUCCH-RNTI, and TPC-PUSCH-RNTI are configured with higher layer signalling. The M-RNTI, P-RNTI, and SI-RNTI are defined with prescribed values.

The PDCCH involving CRC scrambled with each RNTI may correspond to different transport channel and logical channel depending on an RNTI value. That is different information may be indicated depending on the RNTI value.

A single SI-RNTI is used to address the SIB 1 as well as all the SI messages.

The terminal device applies a system information acquisition procedure to acquire the AS- and NAS-system information (hat is broadcasted by the EUTRAN. This procedure applies to a terminal device in the idle mode (idle state, RRC_IDLE) and the connected mode (connected state, RRC_CONNECTED).

The terminal device needs to hold a valid version of required system information.

When in the idle mode, via a system information block type 8 (SIB 8) relaying on the support of the associated RAT and a system information block type 17 relying on the support of wireless local area network (WLAN) interworking assisted by a radio access network (RAN), not only the SIB 2 but also the MIB and the SIB 1 are required.

When in the connected, mode, the MIB, the SIB 1, the SIB 2, and the SIB 17 are required.

The terminal device deletes the system information three hours after the terminal device confirms that the stored system information is valid.

When a system information value tag included in the SIB 1 is different from the one of the stored system information, the terminal device considers any stored system information except the system information block type 10 (SIB 10), the system information block type 11 (SIB 11), the system information block type 12 (SIB 12), and the system information block type 14 (SIB 14) to be invalid.

The terminal device is in the connected mode when an RRC connection is established. The terminal, device is in the idle mode when an RRC connection is not established.

The terminal device in the idle mode may have a terminal device-specific DRX configured by higher layers. Furthermore, the terminal device in the idle mode has mobility thereof controlled. Furthermore, the terminal device in the idle mode monitors a PCH to detect incoming calls, system information change, an ETWS notification for a terminal device capable of ETWS, and a CMAS notification for a terminal device capable of CMAS. Furthermore, the terminal device in the idle mode performs neighboring cell measurements and cell (re)selection. Furthermore, the terminal device in the idle mode acquires system information. Furthermore, the terminal device in the idle mode logs available measurements together with location and time for logged measurement configured terminal devices.

The terminal device in the connected mode transfers unicast data to/from a terminal device. Furthermore, at lower layers, the terminal device in the connected mode may be configured with a terminal device-specific DRX. For a terminal device supporting carrier aggregation, one or more SCells aggregated with the PCell are used to increase a bandwidth. For a terminal device supporting dual connectivity, one secondary cell group (SCG) aggregated with the master cell group (MCG) is used to increase a bandwidth. Furthermore, the terminal device in the connected mode has mobility thereof controlled in a network. Furthermore, the terminal device in the connected mode monitors PCH and or SIB 1 contents to detect system information change, an ETWS notification for a terminal device capable of ETWS, and a CMAS notification for a terminal device capable of CMAS. Furthermore, the terminal device in the connected mode monitors control channels associated with shared data channels to determine if data is scheduled. Furthermore, the terminal device in the connected mode provides channel quality and feedback information. Furthermore, the terminal device in the connected mode performs neighboring cell measurements and measurement reporting. Furthermore, the terminal device in the connected mode acquires system information.

The PBCH is allocated to six RBs at the center of downlink bandwidth configuration (i.e., 72 REs) in the frequency domain, and is allocated to indices (OFDM symbol indices) 0 to 3 in slot 1 (the second slot of the subframe, slot index 1) of subframe 0 (the first subframe of the radio frame, subframe index 0) in the time domain. Note that the downlink, bandwidth configuration is represented by a multiple of the resource block size in the frequency domain, expressed as the number of subcarriers. Furthermore, the downlink bandwidth configuration is a downlink transmission bandwidth configured in a certain cell. That is, the PBCH is transmitted with six RBs at the center of the downlink transmission bandwidth.

The PBCH is not transmitted with resources reserved for the DLRS. That is, the PBCH is mapped to resources other than the DLRS resources. Regardless of the actual configuration, the PBCH mapping is performed by assuming CRSs for existing antenna ports 0 to 3. Furthermore, resource elements for the CRSs for the antenna ports 0 to 3 are not utilized for PDSCH transmission.

As broadcast information, a cell global identity (CGI) indicating a cell-specific identity, a tracking area identify (TAI) for managing a standby area by paging, random access configuration information (such as a transmission timing timer), shared radio resource configuration information, neighboring cell information, and uplink access restriction information on the cell, and the like are notified.

The downlink reference signal (DLRS) is classified into multiple types according to use thereof. For example, the CRS is a pilot signal transmitted with prescribed power in each cell and is a downlink reference signal periodically repeated in the frequency domain and the time domain under a prescribed rule. The terminal device receives the CRS to measure reception quality (reference signal received power (RSRP), reference signal received quality (RSRQ)) for each cell. The terminal device also uses the CRS as a reference signal for demodulation of a PDCCH or a PDSCH transmitted at the same time as the CRS. The sequence used for the CRS is distinguishable among the cells.

The DLRS is also used for estimation (channel estimation) of downlink channel variation. A DLRS used for estimation of channel variation is referred to as "channel state information reference signal (CSI-RS)." Furthermore, a DLRS individually configured for each terminal device is referred to as "UERS", "DMRS", or "Dedicated RS", and is referenced for a channel compensation process on a channel when demodulating an enhanced PDCCH (EPDCCH) or a PDSCH.

The channel state information (CSI) includes a channel quality indicator (CQI), a precoding matrix indicator (PMI), a precoding type indicator (PTI), and a rank indicator (RI), which can be used respectively for specifying (representing) a preferable modulation scheme and coding rate, a preferable precoding matrix, a preferable PMI type, and a preferable rank. Note that each "indicator" may be denoted as "indication." Moreover, the CQI and the PMI are classified into a wideband CQI and PMI assuming transmission using all the resource blocks in a single cell and a subband CQI and PMI assuming transmission using some contiguous resource blocks (subbands) in a single cell. Moreover, the PMI include a normal type of PMI indicating a single preferable precoding matrix with a single PMI, and another type of PMI indicating a single preferable precoding matrix with two kinds of PMIs, a first PMI and a second PMI. Note that the CSI is reported on a PUCCH and a PUSCH.

The physical downlink control channel (PDCCH) is transmitted with several OFDM symbols (e.g., 1 to 4 OFDM symbols) from the beginning of each subframe. The enhanced physical downlink control channel (EPDCCH) is a PDCCH allocated in OFDM symbols in which a PDSCH is allocated. The PDCCH or EPDCCH is used to notify the terminal device of radio resource allocation information in accordance with scheduling determined by the base station device, information indicating an adjustment amount for an increase or decrease in transmit power, and other control information. That is, the PDCCH/EPDCCH is used to transmit DCI (or a DCI format including at least one piece of DCI). In each embodiment of the present invention, even when the PDCCH alone is described, both physical channels, that is, the PDCCH and the EPDCCH, are included unless otherwise noted.

The PDCCH is used to notify the terminal device (UE) and a relay station device (RN) of information on resource allocation of a paging channel (PCH) and DL-SCH, and HARQ information on the DL-SCH (DL HARQ). The PDCCH is also used to transmit uplink scheduling grant and sidelink scheduling grant.

The EPDCCH is used to notify the terminal device (UE) of the DL-SCH resource allocation and HARQ information on the DL-SCH. The EPDCCH is also used to transmit the uplink scheduling grant and the sidelink scheduling grant.

The PDCCH is transmitted with an aggregation of one or several consecutive control channel elements (CCEs). Note that a single CCE corresponds to nine resource element groups (REGs). The number of CCEs available in the system is determined without a physical control format indicator channel (PCFICH) and a physical HARQ indicator channel (PHICH). The PDCCH supports multiple formats (PDCCH formats). For each PDCCH format, the number of CCEs, the number of REGs, and the number of PDCCH bits are defined. A single REG is constituted of four REs. That is, one PRB may include up to three REGs. The PDCCH format is determined depending on the size of the DCI format, and the like.

Multiple PDCCHs are mapped to the whole downlink transmission bandwidth, and thus, the terminal device continues decoding PDCCHs until a PDCCH addressed to the terminal device itself is detected. That is, the terminal device cannot detect the PDCCH by receiving only some of the frequency domain and decoding the same.

Multiple PDCCHs may be transmitted in a single subframe. Moreover, the PDCCH is transmitted through the same set of antenna ports as that for the PBCH. The EPDCCH is transmitted through an antenna port different from that for the PDCCH.

The terminal device needs to monitor a PDCCH addressed to the terminal device itself and receive the PDCCH addressed to the terminal device itself, before transmitting and receiving downlink data or a layer-2 message and layer-3 message which are higher-layer control information (such as a paging or handover command) to acquire, from the PDCCH, radio resource allocation information called uplink grant for transmission and downlink grant (downlink assignment) for reception. Note that the PDCCH can be configured so as to be transmitted in a resource block domain allocated individually to the terminal device by the base station device, in addition to being transmitted in the OFDM symbols described above.

The DCI is transmitted in a specific format The uplink grant and downlink grant are transmitted in different formats. For example, the terminal device can acquire uplink grant from DCI format 0, and acquire downlink grant from DCI format 1A. In addition, other DCI formats are provided, including a DCI formal containing only DCI indicating a transmit power control command tor the PUSCH or PUCCH (DCI format 3/3A), a DCI format containing DCI indicating UL-DL configuration (DCI format 1C), and the like. For example, the radio resource allocation information for the PUSCH and the PDSCH is one type of DCI.

On the basis of the detected DCI (or a value set in the detected DCI), the terminal device can configure various parameters of corresponding uplink signals and downlink signals, and perform transmission and reception. For example, when DCI on PUSCH resource allocation is detected, the terminal device can allocate, on the basis of the DCI, the PUSCH resource and transmit the PUSCH. When a transmit power control command (TPC command) for the PUSCH is detected, the terminal device can adjust, on the basis of the DCI, the transmit power of the PUSCH. When DCI on PDSCH resource allocation is detected, the terminal device can receive the PDSCH from a resource indicated on the basis of the DCI.

The terminal device can acquire (discriminate among) various DCI (DCI formats) by decoding a PDCCH involving cyclic redundancy check (CRC) scrambled with a specific radio network temporary identifier (RNTI). The higher layer determines which PDCCH involving CRC scrambled with any RNTI to decode.

Control information transmitted on a DL-SCH or a PCH corresponding to the PDCCH differs depending on with which RNTI the PDCCH is scrambled. For example, when scrambled with a paging RNTI (P-RNTI), information on paging is transmitted on the PCH. When scrambled with a system information RNTI (SI-RNTI), system information may be transmitted on the DL-SCH.

Moreover, the DCI formal is mapped to a search space (common search space (CSS), UE-specific search space (UESS)) given by a specific RNTI. Furthermore, the search space is defined as a set of PDCCH candidates to be monitored. That is, in each embodiment of the present invention, "monitoring a search space" is synonymous with "monitoring a PDCCH." Note that the CSS and the UESS in the PCell sometimes overlap. In the EPDCCH only the UESS may be defined.

The PHICH is used to transmit an HARQ-ACK/NACK (NAK) in response to uplink transmission.

The PCFICH is used to notify the terminal device and the relay station device of the number of OFDM symbols used for the PDCCH. Furthermore, the PCFICH is transmitted in each downlink subframe or each special subframe.

The physical downlink shared channel (PDSCH) is used to notify the terminal device of broadcast information (system information) that is not notified on the PCH, the paging, or the PBCH, as a layer-3 message, in addition to downlink data (DL-SCH data, a DL-SCH transport block). The radio resource allocation information on the PDSCH is indicated with the PDCCH. The PDSCH is allocated in an OFDM symbol other than an OFDM symbol in which the PDCCH is transmitted. That is, the PDSCH and the PDCCH are subjected to time division multiplexing (TDM) within a single subframe. However, the PDSCH and the EPDCCH are frequency division multiplexing (FDM) within a single subframe.

The PDSCH may also be used to broadcast the system control information.

The PDSCH may also be used as paging when the network does not know a cell in which the terminal device is located. That is, the PDSCH may be used to transmit paging information and a modification notification of system information.

Moreover, the PDSCH may be used to transmit control, information between a terminal device and the network, to the terminal device having no RRC connection with the network (the terminal device in the idle mode).

The PDSCH may also be used to transmit dedicated control information between a terminal device and the network, to the terminal device having an RRC connection (the terminal device in the connected mode).

The physical uplink control channel (PUCCH) is used to perform reception confirmation reply (hybrid automatic repeat request-acknowledgment (HARQ-ACK) or acknowledgment/negative acknowledgment (ACK/NACK or ACK/NAK)) for downlink data transmitted on the PDSCH, downlink channel (channel state) information (CSI) report, and uplink radio resource allocation request (radio resource request, scheduling request (SR). That is, the PUCCH is used to transmit the HARQ-ACK/NACK, the SR, or the CSI report in response to downlink transmission. For the PUCCH, multiple formats are supported according to the type of uplink control information (UCI) such as the HARQ-ACK, the CSI, and the SR to be transmitted. For the PUCCH, a resource allocation method and a transmit power control method are defined for each format. The PDCCH uses one RB in each of two slots of one subframe. That is, the PUCCH is constituted of one RB, irrespective of the format. Furthermore, the PUCCH may not be transmitted in the UpPTS of the special subframe.

When the PUCCH is transmitted in an SRS sub frame, in a PUCCH format to winch a shortened format is applied (e.g., formats 1, 1a, 1b, and 3), the last one symbol or two symbols to which an SRS may possibly be allocated (the last one symbol or two symbols of the second slot of the sub frame) will be made empty.

One RB in each slot may support a combination of PUCCH formats 1/1a/1b and PUCCH formats 2/2a/2b. That is, the terminal device may transmit PUCCH formats 1/1a/1b and PUCCH formats 2/2a/2b in one RB.

When the number of repetitions is configured for the PUCCH, a pseudo-random sequence generator need not be initialized with an initial value until the repeated transmission of the PUCCH is completed.

The physical uplink shared channel (PUSCH) mainly transmits uplink data (UL-SCH data, a UL-SCH transport block) and control data, and may include uplink control information (UCI) such as CSI, an ACK/NACK (HARQ-ACK), and an SR therein. Moreover, the physical uplink shared channel is also used by the terminal device to notify the base station device of a layer-2 message and layer-3 message, which are higher-laYer control information, in addition to uplink data. In addition, as with downlink, the radio resource allocation information on the PUSCH is indicated with the PDCCH (PDCCH involving a DCI format). When the PUSCH is transmitted in an SRS subframe and a PUSCH resource overlaps with an SRS bandwidth, then the last one symbol or two symbols to which the SRS may possibly be allocated (the last one symbol or two symbols of the second slot of the subframe) will be made empty.

When the number of repetitions is configured, for the PUSCH, a scrambling sequence generator need not be initialized with an initial value until the repeated transmission of the PUSCH is completed.

An uplink reference signal (uplink pilot signal, uplink pilot channel, ULRS) includes a demodulation reference signal (DMRS) to be used by the base station device to demodulate the PUCCH and/or PUSCH, and a sounding reference signal (SRS) to be mainly used by the base station device to estimate an uplink channel state. Moreover, the SRS includes a periodic sounding reference signal (P-SRS), which is transmitted periodically, and an aperiodic sounding reference signal (A-SRS), whose transmission is triggered by the base station device. Note that the P-SRS is referred to as "trigger type 0 SRS", and the A-SRS is referred to as "trigger type 1 SRS." The SRS is allocated to the last one symbol or two symbols in the subframe. The subframe in which the SRS is transmitted may be referred to as "SRS subframe." The SRS subframe is determined on the basis of a cell-specific subframe configuration and a terminal device-specific subframe configuration. When the PUSCH is transmitted in a subframe to which a cell-specific subframe configuration is set, none of the terminal devices in a cell allocate a PUSCH resource to the last symbol in the subframe. For the PUCCH, when a shortened format is applied, in a subframe to which a cell-specific subframe configuration is set, none of the terminal devices in a cell allocate a PUCCH resource in the last symbol in the subframe. However, the shortened format may not be applied depending on the PUCCH format. In such a case, the PUCCH may be transmitted in a normal format (i.e., transmitted with a PUCCH resource allocated to an SRS symbol). For the PRACH, the transmission thereof has a higher priority. When an SRS symbol is arranged on a guard time of the PRACH, the SRS may be transmitted.

The physical random access channel (PRACH) is a channel that is used to notify (configure) a preamble sequence and includes a guard time. The preamble sequence is constituted so that the base station device is notified of the information with multiple sequences. For example, when 64 sequences are available, 6-bit information can be provided to the base station device. The PRACH is used by the terminal device to access the base station device (such as an initial access). The PRACH is used to transmit a random access preamble.

The terminal device uses the PRACH to request an uplink radio resource when no PUCCH is configured for an SR or to request the base station device for transmission timing adjustment information (also referred to as "timing advance (TA) command") necessary for matching uplink transmission timing to a reception timing window of the base station device, for example. Moreover, the base station device can also request the terminal device to initiate a random access procedure with a PDCCH (referred to as "PDCCH order").

The layer-3 message is a message exchanged between the RRC (radio resource control) layers of the terminal device and the base station device and handled in a protocol for a control-plane (CP, C-plane), and may be used as a synonym of RRC signalling or RRC message. Note that a protocol handling user data (uplink data and downlink data) is referred to as "user-plane (UP, U-plane)" in contrast to the control-plane. Here, a transport block which is transmission data in the physical layer, includes C-plane messages and U-plane data in higher layers. That is, in each embodiment of the present invention, "data" and "transport block" are synonymous. Detailed description of other physical channels is omitted.

A communicable range (communication area) at each frequency controlled by the base station device is assumed to be a cell. Here, the communication area covered by the base station device may be different in size and shape for each frequency. Moreover, the covered area may be different for each frequency. A radio network in which cells having different types of base station devices and different cell, radii coexist in the area on the same frequency and/or different frequencies to form a single communication system, is referred to as "heterogeneous network."

The terminal device has no connection established with any network immediately after being switched on (e.g., upon activation), for example. Such a state without connection is referred to as "idle mode (RRC_IDLE)." To perform communication, the terminal device in the idle mode needs to establish connection with any network. That is, the terminal device needs to be in the connected mode (RRC_CONNECTED). Here, the network may include a base station device, an access point, a network server, a modem, and the like that belong to the network.

Then, to perform communication, the terminal device in the idle mode needs to perform public land mobile network (PLMN) selection, cell selection/re-selection, location registration, manual selection of a closed subscriber group (CSG) cell, and the like.

When the terminal device is switched on, a PLMN is selected by a non-access stratum (NAS). For the selected PLMN, an associated radio access technology (RAT) is set. The NAS provides a list of equivalent PLMNs, if available, so that an access stratum uses the list for cell selection/re-selection.

With the cell selection, the terminal device searches for a suitable cell of the selected PLMN, and selects a cell to provide available services (serving cell). Furthermore, the terminal device tunes to its control channel. Such selection is referred to as "camping on the cell."

The terminal device, if necessary, register its presence (information on a selected cell and information on a tracking area) in the tracking area of the selected cell as an outcome of a successful location registration which causes the selected PLMN to be the registered PLMN.

When finding a more suitable cell, the terminal device re-selects the cell according to cell re-selection criteria and, camps on the cell. When a new cell does not belong to at least one tracking area to which the terminal device has been registered, location registration for the new cell is performed.

If necessary, the terminal device searches for higher priority PLMNs at regular time intervals, and searches for a suitable cell when another PLMN has been selected by the NAS.

Search of available CSGs may be triggered by the NAS to support manual CSG selection.

When losing coverage of the registered PLMN, the terminal device may allow a user to configure either automatic selection of a new PLMN (automatic mode) or manual selection in which an indication of which PLMNs are available is given to the user (manual mode). However, when receiving a service not requiring registration, the terminal device need not perform such registration.

The following (A1) to (A5) are the purposes of the terminal device in an idle mode to camp on a cell.

(A1) it enables the terminal device to receive system information, from the PLMN (or EUTRAN).

(A2) When registered and if the terminal device wishes to establish an RRC connection, the terminal device performs an initial access to the network on the control channel of the cell on which the terminal device is camped.

(A3) When receiving a call for the registered terminal device, the PLMN knows a set of tracking areas in which the terminal device camps (i.e., camped cells). The PLMN then can transmit a "paging message" for the terminal device on a control channels of all the cells in this set of tracking areas. The terminal device then tunes to the control channel of one of the cells in the registered tracking areas, enabling the terminal device to receive the paging message and respond to the control channel.

(A4) It enables the terminal device to receive notifications of earthquake and tsunami warning system (ETWS) and commercial mobile alter system (CMAS).

(A5) It enables the terminal device to receive multimedia broadcast-multicast services (MBMSs).

When the terminal device is unable to find a suitable cell to camp on or the location registration fails, the terminal device attempts to camp on a cell irrespective of the PLMN identity and enters a "limited service" state. Here, the limited service includes an emergency call, ETWS, CMAS, and the like in a cell satisfying a condition. On the other hand, a normal service is provided for public use in a suitable cell. An operator-specific service and the like are also provided.

When the NAS indicates the start of a power saving mode (PSM), an access stratum (AS) configuration is maintained and all the timers in operation continue to operate; however, the terminal device need not perform an idle mode task (e.g., PLMN selection, cell selection/re-selection, and the like). When a certain time expires with the terminal device in the PSM, it depends on an implementation of the terminal device whether the last process at the end of the PSM is performed or a corresponding process is immediately performed. When the NAS indicate the end of the PSM, the terminal device performs all the idle mode tasks.

The terminal device operates by assuming the inside of a cell as a communication area. When the terminal device moves from a cell to another cell, the terminal device moves to another suitable cell through a cell selection/re-selection procedure at the time of having no connection fin RRC_IDLE, in the idle mode, during no communication) and through a handover procedure at the time of having connection (in RRC_CONNECTED, in the connected mode, during communication). A suitable cell is in general a cell that is determined that access from the terminal device is not prohibited on the basis of information specified by the base station device and that has a downlink reception qualify satisfying a prescribed condition.

In PLMN selection, the terminal device reports, in accordance with a request from the NAS or autonomously, available PLMNs to the NAS. During PLMN selection, a specific PLMN may be selected either automatically or manually on the basis of a list of PLMN identities based on priority. Each PLMN in the list of PLMN identities is identified by a "PLMN identity." In system information on a broadcast channel, the terminal device can receive one or more "PLMN identities" in a certain cell. A result of the PLMN selection performed by the NAS is an identity of the selected PLMN.

In response to the request from the NAS, the AS searches for available PLMNs and reports the same to the NAS.

For the EUTRA, to find available PLMNs, the terminal device scans all the RF channels in the EUTRA operating band corresponding to the capability information on the terminal device. In each carrier (component carrier), the terminal device searches for the strongest cell and reads system information thereon to find a PLMN to which the cell belongs. If the terminal device can read one or some PLMN identities in the strongest cell, each found PLMN is reported to the NAS as a PLMN having higher quality. Note that the criteria for the PLMN having higher quality include that an RSRP value measured with respect to an EUTRA cell is equal to or higher than a prescribed value (e.g., −110 dBm). Here, the strongest cell is, for example, a cell indicating the best (highest) value for measurement values such as RSRP and RSRQ. That is, the strongest cell is a cell the most preferable to communication in the terminal device.

When the found PLMN does not satisfy the criteria but are readable, a PLMN identity is reported together with an RSRP value to the NAS. The measurement values reported to the NAS are the same for each PLMN found in a single cell.

The search for PLMns may be stopped by a request from the NAS. The terminal device may optimize the PLMN search with the stored information (e.g., information on a carrier frequency and cell parameter from reception measurement control information elements, and the like).

Once the terminal device has selected a PLMN, the cell selection procedure is performed in order to select a suitable cell of the PLMN to camp on.

If a CSG-ID is provided by the NAS as a part of PLMN selection, the terminal device searches for an acceptable or suitable cell belonging to the provided CSG-ID to camp on. When the terminal device is no longer camped on a cell with the provided CSG-ID, the AS informs the NAS of this information.

In cell selection/re-selection, the terminal device performs measurements for the cell selective/re-selection.

The NAS can control the RAT in which the cell selection is performed, by indicating the RAT associated, with the selected PLMN and by maintaining a list of forbidden registration areas and a list of equivalent PLMNs, for example. The terminal device selects a suitable cell, on the basis of idle mode measurements and the cell selection criteria.

To accelerate the cell selection process, the information stored for some RATs may be utilized in the terminal device.

When being camped on a cell, the terminal device searches for a better cell according to the cell re-selection criteria. When a better cell is found, that cell is selected. The change of cell may imply a change of RAT. Here, a better cell is a cell more suitable to perform communication. For example, a better cell is a cell having higher communication quality (e.g., having good results for measurement values of RSRP and RSRQ).

When the cell selection/re-selection results in changes in the received system information on the NAS, the NAS is informed of this information.

For a normal service, the terminal device camps on a suitable cell and tunes to the control channel of the cell. This allows the terminal device to receive the system information from the PLMN. Furthermore, the terminal device can receive, from the PLMN, registration area information such as tracking area information. Furthermore, the terminal, device can receive other AS and NAS information. When being registered, the terminal device can receive paging and notification messages from the PLMN. Moreover, the terminal device can initiate transition to the connected mode.

The terminal device uses one of the two cell selection procedures. Initial cell selection requires no prior knowledge (stored information) that an RF channel is an EUTRA carrier. To find a suitable cell, the terminal device scans all RF channels in the EUTRA operating bands in accordance with the capability information on the terminal device. On each carrier frequency, the terminal device needs to only search for the strongest cell. Once a suitable cell is found, the cell is selected.

Stored information cell selection requires stored information on carrier frequency from previously received measurement control information elements or from previously detected cells, and optionally further requires information on a cell parameter. Once the terminal device has found a suitable cell, the terminal device selects the cell. When no suitable cell is found, the initial cell selection procedure is started.

In addition to normal cell selection, manual selection of CSGs is supported by the terminal device upon request from higher layers.

Absolute priorities of different EUTRAN frequencies or inter-RAT frequencies may be provided to the terminal device in the system information (e.g., an RRC connection release message), or by inheriting from another RAT at inter-RAT cell (re)selection. In the case of system information, an EUTRAN frequency or inter-RAT frequency is listed without providing a priority.

When priorities are provided in dedicated signalling, the terminal device ignores all the priorities provided in the system information. When the terminal device is in a state of being camped on any cell, the terminal device only applies the priorities provided from a current cell (currently connected cell) in the system information. The terminal device preserves the priorities provided by the dedicated signalling or RRC connection release message, unless otherwise specified.

When the terminal device in a camped normally state has an individual priority other than the one for the current frequency, the terminal device consider the current frequency to be the lowest priority frequency (i.e., lower than any of the eight network configured values).

While the terminal device is camped on a suitable CSG cell, the terminal device always considers the current frequency to be the highest priority frequency (i.e., higher than any of the eight network configured values) irrespective of any other priority values allocated to the current frequency.

When the terminal device enters the RRC_CONNECTED state, a timer (T320) for the optional validity time of dedicated priorities expires, or the PLMN selection is performed on request by the NAS, the terminal device deletes the priorities provided by the dedicated signalling.

The terminal device only performs cell re-selection evaluation for EUTRAN frequencies and inter-RAT frequencies that are given in the system information and for which the terminal device has a priority provided.

The terminal device does not consider any blacklisted cell as a candidate for cell re-selection.

The terminal device inherits the priorities provided by the dedicated signalling and the remaining validity time.

When the terminal device supports manual CSG selection, to search for available CSGs in response to a request from the NAS, the AS scans all RF channels in the EUTRA operating bands corresponding to the capability information. On each carrier, the terminal device searches at least for the strongest cell, reads the system information thereof and reports, to the NAS, an available CSG-ID together with the PLMN and a "Home Node B (HNB) name" (if broadcast).

When the NAS has selected a CSG and provided this selection to the AS, the terminal device searches for an acceptable or suitable cell satisfying a condition for belonging to the selected CSG to camp on.

In addition to normal cell re-selection, when at least one CSG-ID associated with a PLMH identity is included in a CSG whitelist of the terminal device, the terminal device may use, in accordance with performance requirements, an autonomous search function to detect at least previously visited (accessed) CSG member cells on non-serving frequencies, including inter-RAT frequencies. To search for cells, the terminal device may further use an autonomous search function on the serving frequency. When the CSG whitelist of the terminal device is empty, the terminal device disables the autonomous search function for CSG cells. Here, the autonomous search function, per terminal device implementation, determines when and where to search for CSG member cells.

When the terminal device detects one or more suitable CSG cells on different frequencies and the concerned CSG cell is the highest ranked cell on that frequency, the terminal device re-selects one of the detected cells irrespective of the frequency priority of the cell the terminal device is currently camped on.

When the terminal device detects a suitable CSG cell on the same frequency, the terminal device re-selects this cell in accordance with the normal cell re-selection rule.

When the terminal device detects one or more CSG cells on another RAT, the terminal device re-selects one of those cells in accordance with a specific rule.

While camped on a suitable CSG cell, the terminal device applies the normal cell re-selection.

To search for suitable CSG cells on non-serving frequencies, the terminal device may use the autonomous search function. When the terminal device detects a CSG cell on a non-serving frequency, the terminal device may re-select the detected CSG cell when the detected CSG cell is the highest ranked cell on the frequency.

When the terminal device detects one or more CSG cells on another RAT, the terminal device may re-select one of those CSG cells if allowed in accordance with a specific rule.

In addition to normal cell re-selection rules, the terminal device uses the autonomous search function to detect at least previously visited hybrid cells whose CSG ID and associated PLMN identity is in the CSG whitelist in accordance with the performance requirements. The terminal device treats the detected hybrid cells as CSG cells if the CSG ID and associated PLMN identity of the hybrid cell is in the CSG whitelist and as normal cells otherwise.

When being in the camped normally state, the terminal device performs the following tasks (B1) to (B4).

(B1) The terminal device selects and monitors the indicated paging channel of the cell in accordance with the information transmitted in the system information.

(B2) The terminal device monitors relevant system information.

(B3) The terminal device performs necessary measurements for the cell re-selection evaluation procedure.

(B4) The terminal device performs the cell re-selection evaluation procedure on an internal trigger of the terminal device and/or when information on the broadcast control channel (BCCH) used for the cell re-selection evaluation procedure have been modified.

After transition from the connected mode to the idle mode, if information on a redirected carrier (redirectedCarrierInfo) is included in an RRC connection release message, the terminal device attempts to camp on a suitable cell in accordance with the information. When the terminal device fails to find a suitable cell the terminal device is allowed to camp on any suitable cell of the indicated RAT. If the RRC connection release message does not include the information on a redirected carrier, the terminal device attempts to select a suitable cell on the EUTRA carrier. When no suitable cell is found, the terminal device starts cell selection with the stored information cell selection procedure to search for a suitable cell to camp on.

When the terminal device transitions to a connected mode from a state of being camped on any of the cells, after which the terminal device is re-adjusted to an idle mode, and if the information relating to a redirected earner is included in the RRC connection release message, the terminal device attempts to camp on an acceptable cell in accordance with the information on a redirected carrier. If the RRC connection release message does not include the information on a redirected carrier, the terminal device attempts to select an acceptable cell on the EUTRA carrier. When the terminal device fails to find an acceptable cell, the terminal device continues to search for an acceptable cell of any PLMN, in any cell selection state. In any cell selection state, the terminal device not camping on any cell stay in this state until an acceptable cell is found.

When in a state of camping on any cell, the terminal device performs the following tasks (C1) to (C6).

(C1) In accordance with the information, transmitted in the system information, the terminal device selects and monitors the indicated paging channel of the cell (C2) The terminal device monitors relevant system information.

(C3) The terminal device performs necessary measurements for the cell re-selection evaluation procedure.

(C4) The terminal device performs the cell re-selection evaluation procedure on an internal trigger of the terminal deuce and/or when information on the BCCH used for the cell re-selection evaluation procedure have been modified.

(C5) The terminal device regularly tries all the frequencies of all RATs supported by the terminal device to find a suitable cell. When a suitable cell is found, the terminal device transitions to the camped normally state.

(C6) When the terminal device supports a voice service and the current cell does not support an emergency call as indicated by the system information and no suitable cell is found, the terminal device performs cell selection re-selection to an acceptable cell of any supported RAT, regardless of the priorities provided from the current cell in the system information.

To avoid camping on a cell not capable of starting an IP Multimedia Subsystem (IMS) emergency call, the terminal device allows not to perform re-selection of an EUTRAN cell on the frequency.

The terminal device camps on a cell after performing PLMN selection and cell selection, and thus, the terminal device becomes capable of receiving paging information and system information such as an MIB and an SIB 1, irrespective of the state of the terminal device (an RRC idle (idle mode), an RRC connection (connected mode)). By performing random access, an RRC connection request can be transmitted.

In the random access procedure in the terminal device in the idle mode, higher layers (L2/L3) instructs random access preamble transmission. A physical layer (L1) transmits, in accordance with the instruction, random access preamble. If ACK, in the L1 a random access response is received from the base station device. If the L2/L3 receives the instruction from the L1, the L2/L3 instructs the L1 to transmit an RRC connection request. The terminal device transmits, to the base station device (cell on which the terminal device is camped, EUTRAN, PLMN), an RRC connection request (PUSCH corresponding to a UL-SCH to which an RRC message associated with the RRC connection request is mapped). Upon receiving the RRC connection request, the base station device transmits, to the terminal device, an RRC connection setup (PDCCH and PDSDCH associated with a DL-SCH to which an RRC message associated with the RRC connection set-up is mapped). When receiving the RRC connection setup on the L2/L3, the terminal device enters the connected mode. The L2/L3 of the terminal device instruct the L1 to transmit an RRC connection setup complete, and the procedure ends. The L1 transmits, to the base station device, the RRC connection setup complete (PUSCH corresponding to a UL-SCH to which an RRC message associated with the RRC connection set-up completion is mapped).

The MTC terminal in the idle mode may monitor the PDCCH in the downlink transmission bandwidth indicated in the MIB, until initial access by a random access procedure is completed, until RRC connection is established, or until the support of MTC functions using a UL-SCH corresponding to random access response grant is indicated.

The MTC terminal, in the idle mode may select a sequence indicating that the terminal is the MTC terminal when performing initial access by the random access procedure, and mas transmit a random access preamble of the sequence. When receiving the random access preamble, and if the base station device allows for access from the MTC terminal the base station device may set, to the MIB spare bit, downlink resource allocation to the MTC terminal. The MTC terminal detects, from the resource, a PDCCH corresponding to the random access response, completes the initial access, and establishes initial RRC connection.

To reduce power consumption, the terminal device in the idle mode may receive a paging message by using discontinuous reception (DRX). A paging occasion (PO) is a subframe including a P-RNTI, in which a PDCCH to address to a paging message is transmitted. A paging frame (PF) is a radio frame including one or multiple POs. When DRX is used, the terminal deuce needs to monitor one PO at every DRX cycle. The PO and PF are determined by using a DRX parameter provided in the system information. When a value of the DRX parameter has been changed in the system information, a DRX parameter stored in the terminal device is updated locally. If the terminal device does not have an international mobile subscriber identity (IMSI), and when performing an emergency call without a universal subscriber identify module (USIM), the terminal device uses a default identity (UE_ID=0) and i_s in the PF. That is, the paging information (PCH) is notified by using a PDCCH in a prescribed subframe of a prescribed radio frame.

When the MTC terminal in the idle mode fails to defect, in the MIB, information on the configuration of a PDCCH for the MTC terminal or information on downlink resource allocation, the MTC terminal performs PLMN re-selection or cell re-selection.

The terminal device indicating category 0 can receive, in a single TTI, 1000 bits with respect to a transport block associated with a cell RNTI (C-RNTI)/semi-persistent scheduling (SPS) C-RNTI/P-RNTI/SI-RNTI/Random Access RNTI (RA-RNTI). The terminal device indicating category 0 can also receive, in a single TTI, up to 2216 bits with respect to other transport blocks associated with a P-RNTI/SI-RNTI/RA-RNTI.

Requirement conditions for UE category 0 is caused by assuming the UE category 0 and a single antenna reception unit. These conditions are referred to as "UE category 0 applicability."

The category 0 terminal monitors downlink quality based on a CRS, to detect downlink radio link quality of the PCell.

The category 0 terminal estimates the downlink radio link quality and compares two threshold values ($Q_{out\_Cat0}$ and $Q_{in\_Cat0}$) and an estimated value, to monitor the downlink radio link quality of the PCell.

The threshold value $Q_{out\_Cat0}$ is defined as a level at which the downlink radio link cannot be reliably received and that corresponds to 10% block error rate of a hypothetical PDCCH transmission taking into account the PCFICH errors with transmission parameters.

The threshold value $Q_{in\_Cat0}$ is defined as a level at which the downlink radio link can be reliably received as compared to the threshold value $Q_{out\_Cat0}$ and that corresponds to 2% block error rate of a hypothetical PDCCH transmission taking into account the PCFICH errors with transmission parameters.

For example, a PDCCH/PCFICH transmission parameter for out-of-synchronization (out-of-sync) with respect to the UE category 0 is determined with the DCI format 1A, and the number of OFDM symbols of the PDCCH is determined on the basis of the bandwidth. When the bandwidth is equal to or greater than 10 MHz, the number of OFDM symbols is two symbols. When the bandwidth is equal to or greater than 3 MHz and less than 10 MHz, the number of OFDM symbols is three symbols. When the bandwidth is 1.4 MHz, the number of OFDM symbols is four symbols. Aggregation level of the PDCCH is 4 when the bandwidth is 1.4 MHz, and 8 when the bandwidth is equal to or greater than 3 MHz. The ratio of RF energy (energy per resource element (EPRE) of the PDCCH and average RE energy of an RS is 4 dB, irrespective of the number of CRS antenna ports of the PCell. The ratio of RE energy of the PCFICH and average RE energy of an RS is 4 dB when the number of CRS antenna ports is one antenna port, and 1 dB when the number of CRS antenna ports of the PCell is two or four antenna ports.

For example, a PDCCH/PCFICH transmission parameter for in-synchronization (in-sync) with respect to the UE category 0 is determined with the DCI format 1C, and the number OFDM symbols of PDCCH is determined on the basis of the bandwidth. When the bandwidth is equal to or greater than 10 MHz, the number of OFDM symbols is two symbols. When the bandwidth is equal to or greater than 3 MHz and less than 10 MHz, the number of OFDM symbols is three symbols. When the bandwidth is 1.4 MHz, the number of OFDM symbols is four symbols. The aggregation level of the PDCCH is 4. The ratio of RF energy of the PDCCH and average RF energy of an RS is 1 dB, irrespective of the number of CRS antenna ports. The ratio of RE energy of the PCFICH and average RE energy of an RS is 4 dB when the number of CRS antenna ports of the PCell is one antenna port, and 1 dB when the number of CRS antenna, ports of the PCell is two or four antenna ports.

The terminal device and the base station device may employ a technique for aggregating the frequencies (component carriers or frequency hand) of multiple different frequency bands through carrier aggregation and treating the resultant as a single frequency (frequency band). A component carrier includes an uplink component carrier corresponding to the uplink (uplink cell) and a downlink component carrier corresponding to the downlink (downlink cell). In each embodiment of the present invention, "frequency" and "frequency band" may be used as synonyms.

For example, when five component carriers each having a frequency bandwidth of 20 MHz are aggregated through carrier aggregation, a terminal device capable of carrier aggregation performs transmission and reception by assuming that the aggregated carriers have a frequency bandwidth of 100 MHz. Note that component carriers to be aggregated may have contiguous frequencies or partially discontiguous frequencies. For example, assuming that available frequency bands are a band of 800 MHz, a band of 2 GHz, and a hand of 3.5 GHz, a component carrier may be transmitted in a band of 800 MHz, another component carrier may be transmitted in a band of 2 GHz, and yet another component currier may be transmitted in a band of 3.5 GHz.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal device, and the frequency bandwidths of component carriers to be aggregated may be different from each other. Each frequency bandwidth is preferable equal to any of the frequency bandwidths of conventional cells in consideration of backward compatibility but may be a frequency bandwidth different from any of the frequency bands of conventional cells.

Moreover, component carriers (carrier types) without backward compatibility may be aggregated. Note that the number of uplink component carriers to be allocated to (configured for or added for) the terminal device by the base station device is preferably the same as or fewer than the number of downlink component carriers.

A cell constituted by an uplink component carrier in which an uplink control channel is configured for a radio resource request and a downlink component carrier having a cell-specific connection with the uplink component carrier is referred to as "PCell." A cell constituted by component carriers other than those of the PCell is referred to as "SCell." The terminal device receives a paging message, detects update of broadcast information, carries out an initial access procedure, configures security information, and the like in a PCell, and need not perform these operations in SCells.

Although a PCell is not a target of activation and deactivation controls (in other words, considered as being activated at any time), an SCell has activated and deactivated states, the change of which is explicitly specified by the base station device or is made on the basis of a timer configured for the terminal device for each component carrier. A PCell and an SCell are collectively referred to as "serving cell."

Carrier aggregation is communication using multiple component earners (frequency bands) by multiple cells and is also referred to as "cell aggregation." The terminal device may have radio connection (RRC connection) with the base station device via a relay station device (or repeater) for each frequency. In other words, the base station device of the present embodiment may be replaced with a relay station device.

The base station device manages a cell, which is an area where terminal devices can communicate with the base station device, for each frequency. A single base station device may manage multiple cells. Cells are classified into multiple types of cells depending on the sizes of the areas (cell size) that allow for communication with terminal devices. For example, cells are classified into macro cells and small cells. Moreover, small cells are classified into femto cells, pico cells, and nana cells depending on the sizes of the areas. When a terminal device can communicate with a certain base station device, the cell configured so as to be used for the communication with the terminal device is referred to as "serving cell" while the other cells not used for the communication are referred to as "neighboring cell", among the cells of the base station device.

In other words, in carrier aggregation, multiple serving cells thus configured include one PCell and one or more SCells.

The PCell is a serving cell in which an initial connection establishment procedure (RRC connection establishment procedure) has been performed, a serving cell in which a connection re-establishment procedure (RRC connection reestablishment procedure) has been started, or a cell indicated as a PCell in a handover procedure. The PCell operates at a primary frequency. At the point in time when a connection is (re)established, or later, an SCell may be configured. Each SCell operates at a secondary frequency. The connection may be referred to as "RRC connection." For the terminal dev tee supporting CA, a single PCell and one or more SCells are aggregated.

If the terminal device is configured with more than one serving cell or with a secondary cell group, the terminal device holds, for each serving cell, in response to decoding failure of code blocks of the transport block for at least a prescribed number of transport blocks, received soft channel bit corresponding to at least a prescribed range.

The MTC terminal may support only a single radio access technology (RAT).

Furthermore, the MTC terminal may support only a single operating band. That is, the MTC terminal need not support a function relating to carrier aggregation.

Furthermore, the MTC terminal may support only time division duplex (TDD) and half duplex frequency division duplex (HD-FDD). That is, the MTC terminal need not support full duplex FDD (FD-FDD). The MTC terminal may indicate which duplex mode/frame structure type is supported, via higher layer signalling such as capability information.

Moreover, the MTC terminal may be an LTE terminal of category 0 or category 1. That is, in the MTC terminal, the maximum bit number of transport blocks transmittable/receivable in a single transmission time internal (TTI) may be limited. For example, the maximum bit number per TTI may be limited to 1000 bits. In the LTE, one TTI corresponds to one subframe.

Note that in each embodiment of the present invention, "TIT" and "subframe" are synonymous.

Furthermore, the MTC terminal may support only a single duplex mode/frame structure type.

A frame structure type 1 can be applied to both FD-FDD and HD-FDD. In the FDD, 10 subframes can be utilized for each of downlink transmission and uplink transmission at every 10-ms intervals. Moreover, the uplink transmission and the downlink transmission are separated in the frequency domain. In an HD-FDD operation, the terminal device cannot perform transmission and reception at the same time; however, in an FD-FDD operation, there is no such limitation.

Furthermore, in the MTC terminal, only a narrow bandwidth such as 1.4 MHz may be supported in downlink and uplink. That is, the MTC terminal need not communicate in a wide bandwidth such as 20 MHz.

The MTC terminal having limitation on available bandwidth may be operated in any system bandwidth. For example, scheduling for the MTC terminal supporting only 1.4 MHz bandwidth may also be performed in an operating band of 20 MHz system bandwidth.

Furthermore, the MTC terminal may support only a single RF unit/baseband unit (e.g., 1.4 MHz RF bandwidth) in downlink and uplink.

The base station device may perform control scheduling so that a terminal supporting MTC (MTC terminal) and a terminal not supporting MTC (non-MTC terminal) can perform FDM. In other words, scheduling for radio resource allocation to the MTC terminal or the like is performed by taking into consideration scheduling for radio resource allocation to the non-MTC terminal or the like.

The retuning time at the time at which frequency hopping or frequency for use has been changed may be configured by higher layer signalling.

The transmit power for the MTC terminal may be reduced. The power class and the like may be configured uniquely to the MTC terminal.

For example, in the MTC terminal, the number of downlink transmission modes (PDSCH transmission modes) to be supported may be reduced. That is, when the number of downlink transmission modes or a downlink transmission mode supported by the MTC terminal is indicated as the capability information from the MTC terminal, the base station device configures, on the basis of the capability information, the downlink transmission mode. Note that when a parameter for a downlink transmission mode not supported by the MTC terminal is configured, the MTC terminal may ignore the configuration. That is, the MTC terminal need not perform processing for the downlink transmission mode that is not supported. Here, the downlink transmission mode is used to indicate a transmission scheme of the PDSCH corresponding to the PDCCH/EPDCCH, on the basis of a configured downlink transmission mode, the types of RNTI, a DCI format, and a search space. The terminal device knows, on the basis of such pieces of information, whether the PDSCH is transmitted through antenna port 0, transmitted through the transmit diversity scheme, transmitted through multiple antenna ports, or the like. The terminal device can properly perform a reception process, on the basis of the pieces of information. Even when DCI on PDSCH resource allocation is detected from the same type of DCI format, if the downlink transmission mode or the type of RNTI is different, the PDSCH is not always transmitted through the same transmission scheme.

Moreover, in the MTC terminal, a load of a process in downlink and uplink may be reduced as compared to that of the conventional LTE terminal.

For example, in the MTC terminal the maximum transport block size for unicast and broadcast signalling that are supported may be reduced. Furthermore, the number of the downlink signals that is simultaneously receivable may be reduced. Furthermore, an error vector magnitude (EVM) request condition for transmission and reception, including a controlled modulation scheme, may be moderated. A physical control channel process may be reduced (e.g., reduction of the number of blind decodings and the like). A physical data channel process may also be reduced (e.g., moderation of downlink HARQ timeline, reduction of the number of HARQ process, and the like).

Furthermore, in the MTC terminal, the number of supported CQI/CSI report modes may be reduced. That is, when the MTC terminal indicates, as the capability information, the number of CQI/CSI report modes or a CQI/CSI report mode supported by the MTC terminal, the base station device may configure, on the basis of the capability information, the CQI/CSI report mode. Furthermore, when a parameter for the CQI/CSI report mode not supported by the MTC terminal is configured, the MTC terminal may ignore the configuration. That is, the MTC terminal need not perform processing for the CQI/CSI report mode that is not supported.

To reduce power consumption, techniques for enhancing (improving) a coverage may be applied to the MTC terminal. These techniques may be applied to both FDD and TDD.

The coverage enhancement techniques may include a subframe bundling technique involving HARQ for physical data channels (e.g., PDSCH, PUSCH).

Furthermore, as the coverage enhancement techniques, the use of control channels (e.g., PCFICH, PDCCH) may be controlled.

The coverage enhancement techniques may further include a repetition technique for control channels (e.g., PBCH, PRACH, PDCCH/EPDCCH). Here, the repetition technique refers to a technique in which data mapped to, for example, a physical channel/physical signal (UL-SCH data, DL-SCH data, user data, control data, and the like) is transmitted without being changed for each transmission (for each transmission subframe, for each TTI). That is, a repetition technique refers to a technique in which a physical channel/physical signal to which the same data is mapped is transmitted by a prescribed number of times. For the bundling, data to be mapped may be changed at every transmission. Note that in the repetition technique, the reception accuracy may be improved by performing, as a reception process, an addition process of received signals.

Furthermore, the coverage, enhancement techniques may include control or the repetition technique for PBCH, PHICH, and PUCCH.

The coverage enhancement techniques may further support a power boost due to support of bandwidth narrower than one physical resource block (one PRB) (e.g., 0.5 PRB). That is, the improvement in power density may be supported.

The coverage enhancement techniques may further include resource allocation using the EPDCCH involving cross carrier scheduling and repetition. Moreover, an operation without the EPDCCH may be taken into consideration.

The coverage enhancement techniques may further include a new physical channel format for a system information block (SIB)/random access response (RAR)/paging. Information on the RAR and paging (PCH) is transmitted by being mapped to a DL-SCH indicated by a PDCCH (DCI format) involving CRC scrambled with a certain RNTI; however, a parameter corresponding to coverage enhancement may be added as DCI. For example, in accordance with the type of RNTI to scramble, a DCI field included in the DCI format may vary. DCI indicating a repetition duration (repetition number) may be included. A value to be set to the DCI indicating the repetition duration (repetition number) may be determined in accordance with information to be transmitted. That is, the value to be set to the DCI indicating the repetition duration (repetition number) may be decided in accordance with the type of RNTI to scramble, or the DCI indicating the repetition duration (repetition number) may not be included in the DCI format.

The coverage enhancement techniques may further include an SIB corresponding to channel bandwidth and coverage enhancement.

The coverage enhancement techniques may further support an increase in reference symbol density and a frequency hopping technique.

Furthermore, as the coverage enhancement techniques, the impact on a terminal for power consumption may be taken into consideration for modulation of miss detection rate for the PRACH, and an initial acquisition duration (initial synchronization duration) between terminal and system for a PSS/SSS/PBCH/SIB.

Furthermore, as the coverage enhancement technique, the amount of coverage enhancement required may be configured for each cell or for each terminal, for each channel, and for each channel group. The measurement and report corresponding to the coverage enhancement may be defined.

Moreover, the coverage enhancement techniques and the functions of coverage enhancement may be applied to each of the MTC terminal and the LTE terminal.

For physical layer control signalling (e.g., EPDCCH) or higher layer control signalling (e.g., SIP, RAR, and paging message), a solution common to a low-complexity terminal and a coverage-enhanced terminal may be applied.

To a UE category/type of both standard coverage and enhanced coverage, a power consumption reduction method for prolonging the battery life may be applied. For example, actual working time for transmission and reception is reduced. The number of repeated transmission and reception is minimized by minimizing a control message. Moreover, a channel signal may be changed, improved, re-designed, and added and reduced. Furthermore, a measurement time, a measurement report, feedback signalling, system information acquisition, a synchronization acquisition time and the like may be optimized for reducing power consumption.

An MTC technique and the coverage enhancement-techniques may be optimized for HD-FDD and TDD.

When the terminal device satisfies u requirement tor the MTC and or coverage enhancement, a process relating to mobility may be reduced.

The MTC terminal searches for RF channels tor PLMN selection cell selection for a definite period of time, and if a suitable cell cannot be found, the MTC terminal may be powered off.

When the MTC terminal is in the RRC idle state (idle mode), the MTC terminal may continue to receive and compose a PBCH until an MIB is detected.

If the terminal device supports a function relating to simultaneous transmission of a PUCCH and a PUSCH, and if the terminal device supports a function relating to repeated transmission pf a PUSCH and/or repeated transmission of a PUCCH, the PUCCH and the PUSCH may be transmitted repeatedly by a prescribed number of times, at a timing when the PUSCH transmission occurs or at a timing when the PUCCH transmission occurs. That is, the PUCCH and the PUSCH are transmitted at the same time (i.e., in the same subframe).

In such a case, the PUCCH may include a CSI report, an HARQ-ACK, and an SR.

Furthermore, in such a case, since the power density of the PUCCH is greater than the power density of the PUSCH, the terminal device may perform setting by taking into consideration a prescribed power offset, to adjust the transmit power of the PUCCH. In the base station device, if the PUSCH is detected, the PUCCH can be detected, and thus the power need not be allocated more to the PUCCH. However, when the PUCCH is repeatedly transmitted alone, the terminal device need not take into consideration this prescribed power offset. When the PUCCH is repeatedly transmitted alone, the base station device preferably detects the PUCCH at shorter intervals. In a case of simultaneous transmission of the PUCCH and the PUSCH, the number of repetitions of the PUSCH is used as the number of repetitions of the PUCCH. In addition, when the PUCCH is transmitted alone, the number of repetitions configured in the PUCCH is used as the number of repetitions of the PUCCH. Whether or not to apply a prescribed offset may also be determined on the basis of whether or tint the simultaneous transmission with the PUSCH is performed. When the number of repetitions is configured for the terminal device, all of the repeated transmission of physical channels is performed on the basis of the number.

In such, a case, when the PUCCH transmission overlaps with the PUSCH transmission in the same subframe, and if the simultaneous transmission of the PUCCH and the PUSCH is supported, the terminal device performs the simultaneous transmission of the PUCCH and the PUSCH in the same subframe, by the same number of repetitions or during the same repetition period. At this time, when the transmit power of the PUCCH is configured by the higher layer signalling, the transmit power of PUCCH may be set by using the power offset. Furthermore, when the PUCCH transmission does not overlap the PUSCH transmission, the terminal device sets the transmit power of the PUCCH without using the power offset. If the fact of supporting the simultaneous transmission of the PUCCH and the PUSCH is indicated in a cell allowing for access from the MTC terminal, the base station device assumes that the PUCCH is transmitted at the same liming as the PUSCH, and performs a reception process. For the MTC terminal supporting the simultaneous transmission of the PUCCH and the PUSCH, the base station device may configure the power offset of the PUCCH by using the higher layer signalling.

Furthermore, in such a case, the transmit power of the PUCCH may be set on the basis of a power control adjustment value using a transmit power control command for the PUSCH. That is, a power control adjustment value using a transmit power control command for the PUCCH need not be taken into consideration. However, if there is no specific rule, even when the PUSCH and the PUCCH are transmitted repeatedly in the same subframe and by the same number of times, a power control adjustment value used for setting each of the transmit power may be configured individually. That is, when the base station device indicates, by using the higher layer signalling, that the same power control adjustment value is used, the transmit power of the PUSCH and the PUCCH is set by using the same power control adjustment value. When individually performing the repeated transmission of the PUSCH and the PUCCH, the transmit power is set by using each of the power control adjustment values. Furthermore, when an SRS is transmitted repeatedly in the same subframe, the transmit power thereof may be set by using the same power control adjustment value.

An MIB in which a parameter (information) for an MTC terminal is configured in a spare bit and an MIB in which a parameter (information) for an MTC terminal is not configured in a spare bit may not necessarily be handled as the same MIB. For example, when regarding an MIB in which a parameter (information) for an MTC terminal is not configured in a spare bit as an MIB Type A, and an MIB in which a parameter (information) for an MTC terminal is configured in spare bits as an MIB Type B, the MIB Type A is transmitted at 40-ms intervals, while the MIB Type B may be transmitted at 20-ms intervals. A PBCH subframe and a PBCH radio subframe in which the MIB Type A and the MIB Type B are arranged may be different subframes and different radio frames. An LTE terminal receives only the MIB Type A, while an MTC terminal may receive the MIB Type A and the MIB Type B.

An MIB in which a parameter (information) for an MTC terminal is configured in a spare bit may be transmitted in another cycle, in addition to the above-described PBCH cycle. That is, an MIB in wich a parameter (information) for an MTC terminal is configured in a spare bit may be transmitted in two subframe sets. In other words, an LTE terminal can receive an MIB of a first subframe set. An MTC terminal can receive MIBs of the first subframe set and a second subframe set.

An SIB (SIB 1, SI message, new SIB) in which a parameter (information) for an MTC terminal is configured may be transmitted in another cycle, in addition to the above-described cycle. That is, an SIB in which a parameter (information) for an MTC terminal is configured may be transmitted in two subframe sets. In other words, an LTE terminal can receive an SIB of a first subframe set. An MTC terminal can receive SIBs of the first subframe set and a second subframe set. At this time, the configuration of a PDCCH and/or an EPDCCH for this SIB corresponds to the MTC terminal. That is, the MTC terminal does not expect that such an SIB (DL-SCH corresponding to the SIB) is transmitted on the PDCCH/EPDCCH of the downlink bandwidth not supported by the MTC terminal.

A PCH including a modification notification of an SIB (SIB 1, SI message, new SIB) in which a parameter (information) for an MTC terminal is configured may be transmitted in another cycle, in addition to the above-described cycle. That is, an PCH including a modification notification of an SIB in which a parameter (information) for an MTC terminal is configured may be transmitted in two subframe sets. In other words, an LTE terminal can receive a PCH of a first subframe set. An MTC terminal can receive PCHs of the first subframe set and a second subframe set. At this time, the configuration of a PDCCH and/or an EPDCCH for this PCH corresponds to the MTC terminal. That is, the MTC terminal does not expect that such PCH is transmitted on the PDCCH/EPDCCH of the downlink bandwidth not supported by the MTC terminal.

When a transmission bandwidth supported by the MTC terminal is narrow (e.g., 5 MHz or less), only the local arrangement may be supported in the EPDCCH transmission type. That is, when the transmission bandwidth supported by the MTC terminal is narrow (e.g., 5 MHz or less), the EPDCCH transmission type need not perform distribution arrangement.

When a terminal device supporting MTC functions (MTC terminal) is allowed to access a cell, the terminal device supporting MTC functions may monitor a PBCH and a PDCCH from the cell. In such a case, when information on the configuration of a PDCCH for the MTC terminal is set to an MIB (or MIB spare bit) and/or SI (system information) message, the PDCCH is monitored on the basis of resource allocation and a subframe number, as well as an OFDM symbol (start symbol) and the like included in the configuration of the PDCCH of the MIB and/or SI message. At this time, when a prescribed number of times or a prescribed period is configured to for the PDCCH, the MTC terminal may repeatedly receive the PDCCH and improve the reception accuracy. If the PDCCH involving CRC scrambled with the P-RNTI is received, the MTC terminal acquires paging information from a PCH indicated by DCI included in the PDCCH. Note that this P-RNTI is configured by using system information or higher layer signalling.

Moreover, in such a case, when the information on the configuration of the PDCCH for the MTC terminal is not set to the MIB (or MIB spare bit) and/or SI message, and when a P-RNTI value is set to information on the configuration of the EPDCCH, then if the EPDCCH involving CRC scrambled with the P-RNTI is received, the MTC terminal acquires the paging information from a PCH indicated by DCI included in the PDCCH. Note that this information on the configuration of the EPDCCH is configured by using higher layer signalling.

Moreover, in such a case, when the information on the configuration of the PDCCH for the MTC terminal is not set to the MIB (or MIB spare bit) and/or SI message, and when a P-RNTI value is not set to information on the configuration of the EPDCCH, and when the MTC terminal supports the downlink transmission bandwidth that is configured in the MIB and/or SI message, then if a PDCCH involving CRC scrambled with the P-RNTI is received from a PDCCH domain allocated to the downlink transmission bandwidth, the MTC terminal acquires the paging information from a PCH indicated by DCI included in the PDCCH. Note that this P-RNTI is a default value or a prescribed value. That is, this P-RNTI value may not be configured by using higher layer signalling.

Moreover, in such a case, when the information on the configuration of the PDCCH for the MTC terminal is not set to the MIB (or MIB spare bit) and/or SI message, and when a P-RNTI value is not set to information on the configuration of the EPDCCH, and when the MTC terminal does not support the downlink transmission: bandwidth that is configured in the MIB and/or SI message, the MTC terminal does not monitor the PDCCH from the PDCCH domain allocated to the downlink transmission bandwidth. The MTC terminal cannot monitor the PDCCH involving CRC scrambled with the P-RNTI in an unsupported bandwidth, and thus, the MTC terminal cannot detect a PCH.

Moreover, in such a case, the base station device need not make a change, with respect to the paging information, of the system information on the MTC terminal.

All signals can be transmitted and received in a PCell, but some signals cannot be transmitted and received in an SCell. For example, a PUCCH is transmitted only in a PCell. Additionally, unless multiple timing advance groups (TAGs) are configured for both the cells, a PRACH is transmitted only in a PCell. Additionally, a PBCH is transmitted only in a PCell. Additionally, a master information block (MIB) is transmitted only in a PCell. However, when a terminal device supports a function of transmitting a PUCCH and an MIB in an SCell, a base station device may instruct the terminal device to transmit a PUCCH and an MIB in an SCell. That is, when a terminal device supports the function, a base station device may configure, to the terminal device, a parameter for transmitting a PUCCH and an MIB in an SCell.

In a PCell, a radio link failure (RLF) is detected. In an SCell even if conditions for detection of an RLF are in place, the detection of the RLF is not recognized. In a lower layer of the PCell, when conditions for an RLF are satisfied, the lower layer of the PCell notifies a higher layer of the PCell of the fact that the conditions for an RLF are satisfied. Semi-persistent scheduling (SPS) or discontinuous transmission (DRX) may be performed in a PCell. In an SCell, the same DRX as that in a PCell may be performed. Fundamentally, in an SCell, MAC configuration information/parameters are shared with the PCell of the same call group. Some of the parameters (e.g., sTAG-Id) may be configured for each SCell. Some of timers or counters may be applied only to the PCell. A timer or counter applied only to the SCell may be configured.

Figure 3:
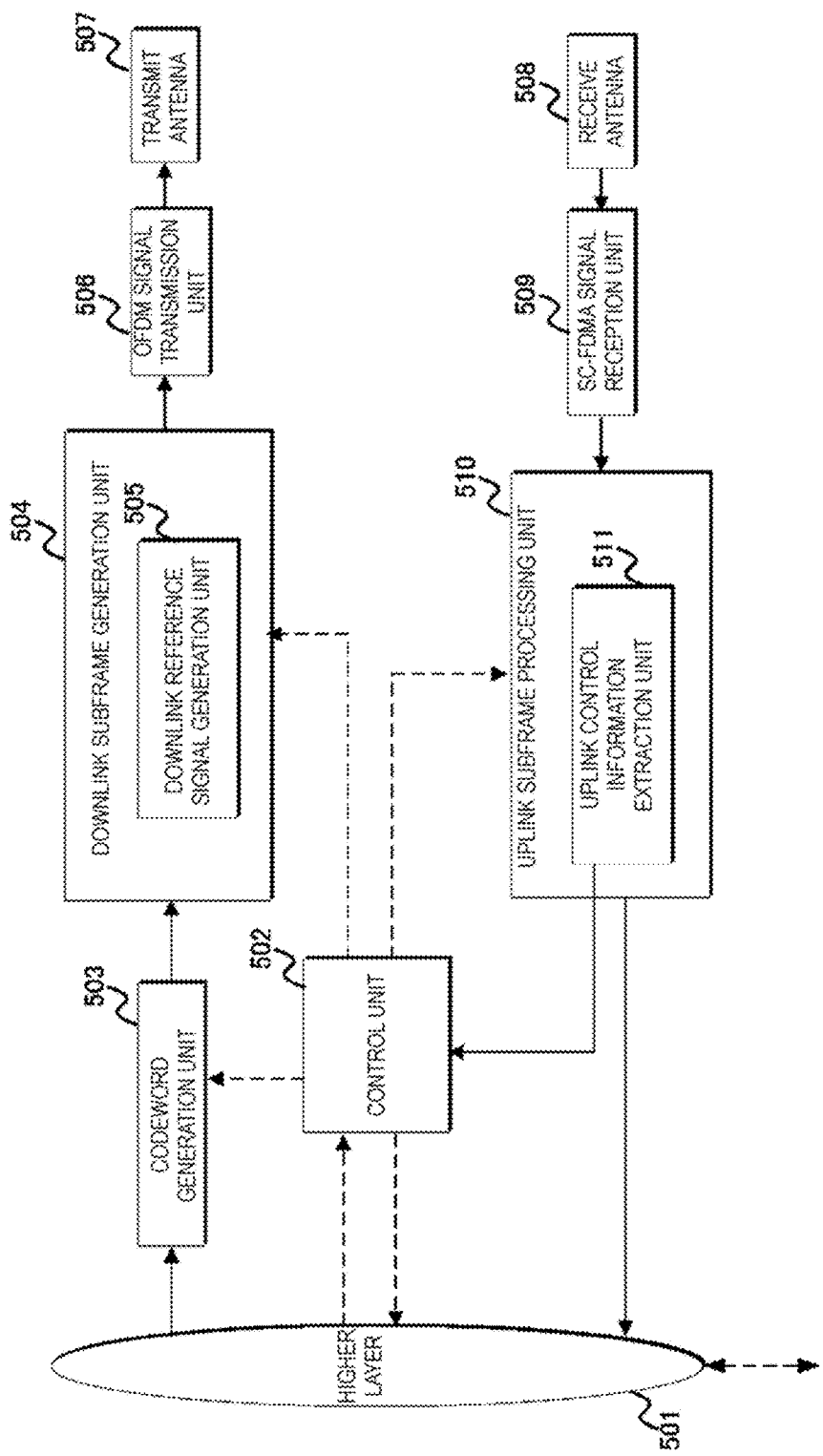
FIG. 3 is a diagram illustrating an example of a block configuration of a base station device according to the first embodiment.

FIG. 3 is a schematic diagram illustrating an example of a block configuration of a base station device 2 according to the present embodiment. The base station device 2 includes a higher layer (higher-layer control information notification unit) 501, a control unit (base station control unit) 502, a codeword generation unit 503, a downlink subframe generation unit 504, an OFDM signal transmission and (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit/HARQ-ACK acquisition unit/SR acquisition unit) 511.

Figure 4:
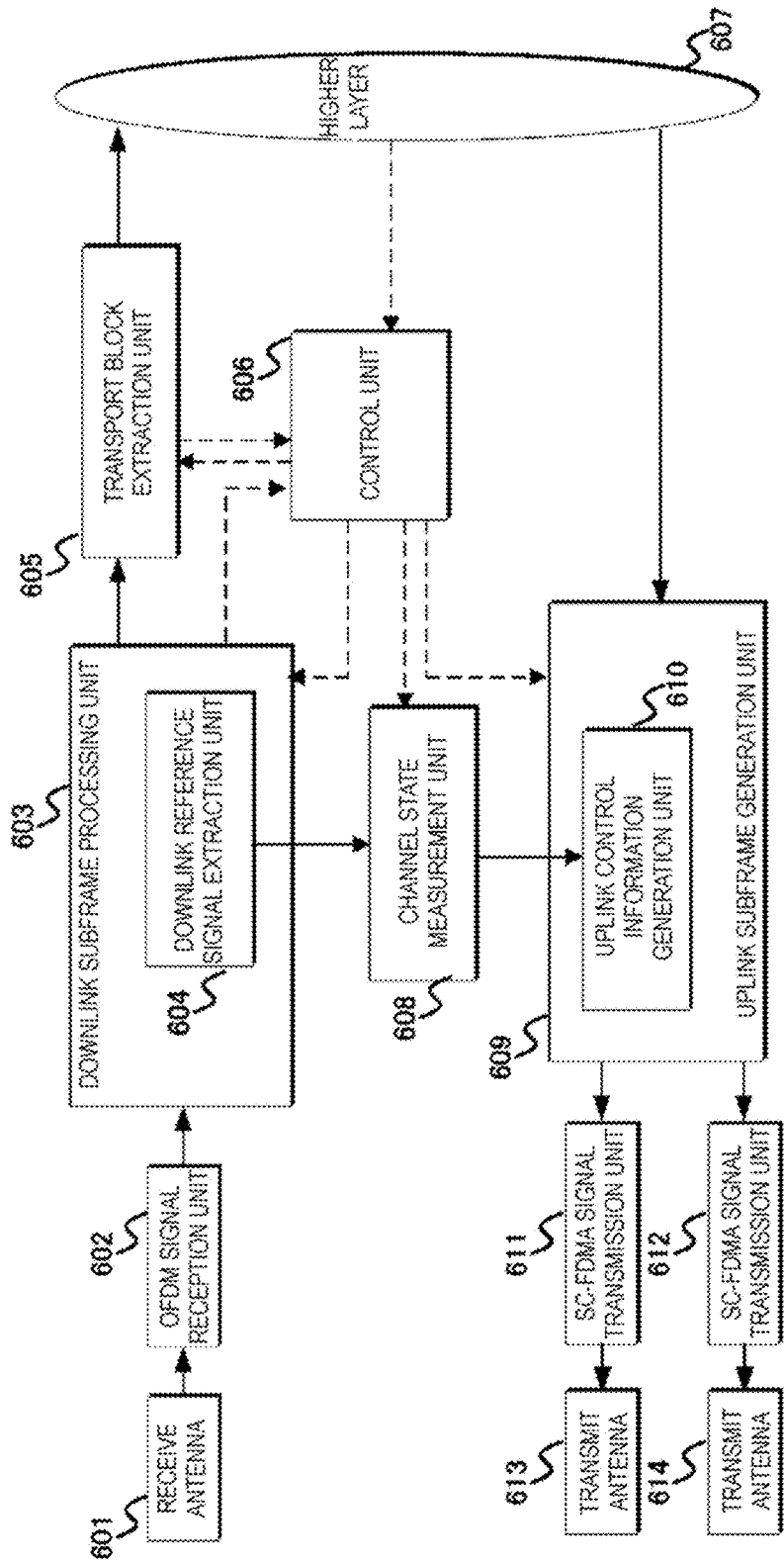
FIG. 4 is a diagram illustrating an example of a block configuration of a terminal device according to the first embodiment.

FIG. 4 is a schematic diagram illustrating au example of a block, configuration of a terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation emit (UCI generation unit) 610.

First, a flow of downlink data transmission and reception will be described with reference to FIG. 3 and FIG. 4. In the base station device 2, the control unit 502 holds a modulation and coding scheme (MCS) indicating a modulation scheme, a coding rate, and the like in the downlink, downlink resource allocation indicating RBs to be used for data transmission, and information to be used for HARQ control (a redundancy version, an HARQ process number, and a new data indicator) and controls the codeword generation unit 503 and downlink subframe generation unit 504 on the basis of these elements. Downlink data (also referred to as "downlink transport block", "DL-SCH data", and "DL-SCH transport block") transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is convened into a modulation symbol sequence through a modulation process, such as phase shift keying (PSK) modulation or quadrature amplitude modulation (QAM). Moreover, a modulation symbol sequence is mapped to REs of some RBs, and a downlink subframe for each antenna port is generated through a precoding process. In this operation, the transmission data sequence transmitted from the higher layer 501 includes higher-layer control information, which is control information on the higher layer (e.g., dedicated (individual) radio resource control (RRC) signalling). Moreover, in the downlink reference signal generation unit 505, a downlink reference signal is generated. The downlink subframe generation unit 504 maps the downlink reference signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a confirmation of including one of OFDM signal transmission unit 506 and one transmit antenna 507 is provided as an example here, a configuration of including multiple OFDM signal transmission units 506 and transmit antennas 507 may be employed when downlink subframes are transmitted on multiple antenna ports. Moreover, the downlink subframe generation unit 504 may also have the capability of generating physical-layer downlink control channels, such as a PDCCH and an EPDCCH to map the channels to REs in downlink subframes. Multiple base station devices each transmit separate downlink subframes.

In the terminal device 1, an OFDM signal is received by the OFDM signal reception unit 602 via the receive antenna 601, and an OFDM demodulation process is performed on the signal.

The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in the regions to which the PDCCH and the EPDCCH can be allocated, and checks CRC bits added in advance (blind decoding). In other words, the downlink subframe processing unit 603 monitors a PDCCH and an EPDCCH. When the CRC bits match an ID (a single terminal-specific identifier assigned to a single terminal, such as a cell-radio network temporary identifier (C-RNTI) or a semi-persistent scheduling-C-RNTI (SPS-C-RNTI), or a temporaly C-RNTI) assigned by the base station device in advance, the downlink subframe processing unit 603 recognizes that a PDCCH or an EPDCCH has been detected and extracts a PDSCH by using control information included in the detected PDCCH or EPDCCH.

The control unit 606 holds an MCS indicating a modulation scheme, a coding rate, and the like in the downlink based on the control information, downlink resource allocation indicating RBs to be used tor downlink data transmission, and information to be used for HARQ control, and controls the downlink subframe processing unit 603, the transport block extraction unit 605, and the like on the basis of these elements. More specifically, the control unit 606 performs control so as to carry out an RE demapping process, a demodulation process, and the like corresponding to an RE mapping process and a modulation process in the downlink subframe generation unit 504. The PDSCH extracted from the received downlink subframe is transmitted to the transport block extraction unit 605. Furthermore, the downlink reference signal extraction unit 604 in the downlink subframe processing unit 603 extracts the downlink reference signal from the downlink subframe.

In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes higher-layer control information, and the higher layer 607 notifies the control unit 606 of a necessary physical-layer parameter on the basis of the higher-layer control information. The multiple base station devices 2 each transmit separate downlink subframes, and the terminal device 1 receives the downlink subframes. Hence, the above-described processes may be carried out for the downlink subframe of each of the multiple base station devices 2. In this case, the terminal device 1 may recognize that multiple downlink subframes have been transmitted from the multiple base station devices 2, or need not recognize this. If the terminal device 1 does not recognize the above, the terminal device 1 may simply recognize that multiple downlinks subframes have been transmitted from multiple cells. Moreover, the transport block extraction unit 605 determines whether or not the transport block has been detected correctly and transmits the determination result to the control unit 606.

Here, the transport block extraction unit 605 may include a buffer portion (soft buffer portion). In the buffer portion, information on the extracted transport block can be stored temporarily. For example, when the same transport block (retransmitted transport block) is received, and if decoding of data for this transport block is not succeeded, the transport block extraction unit 605 combines (composes) newly received data and the data for this transport block temporarily stored in the buffer portion, and attempts to decode the combined data. When the temporarily-stored data becomes unnecessary or when a prescribed condition is satisfied, the butter portion flushes the data. A condition for data to be flushed differs depending on the type of transport block corresponding to the data. The butter portion may be prepared for each data type. For example, as the buffer portion, a message-3 buffer or an HARQ buffer may be prepared, or a buffer portion may be prepared for each layer, L1/L2/L3 and the like. Note that "flushing information/data" includes "flushing a buffer in which information and data are stored."

When the information on the configuration of the PDCCH for the MTC terminal is included in an MIB, the buffer portion of the MTC terminal temporarily buffers the information. The reception of an SIB (SIB 1 and other SI messages) in addition to an MIB in the same TTI or a different TTI may cause an overflow in the buffer portion. When an overflow occurs in the buffer portion, and when the information on the configuration of PDCCH for the MTC terminal is not included in the SIB, the buffer portion holds the system information of the MIB and flushes the system information of the SIB. However, when the information on the configuration of the PDCCH for the MTC terminal is included in the SIB, and if an overflow occurs due to the reception of the MIB and the SIB, the buffer portion holds the system information of the SIB and flushes the system information of the MIB. When a PCH can be detected on the basis of the information on the configuration of the PDCCH for the MTC terminal of the MIB or the SIB, and when the information on the configuration of PDCCH is not included in paging information in the PCH, then even if an overflow occurs due to the reception of MIB or SIB and paging information, the buffer portion preferentially holds the information on the configuration of the PDCCH for the MTC terminal included in the MIB or the SIB, and flushes the overflowed paging information. However, if a notification about a modification of the SIB including the information on the configuration of the PDCCH for the MTC terminal is included in the received paging information, and if an overflow occurs due to the reception of the MIB and the paging information, the buffer portion holds the paging information and flushes the MIB. For example, the buffer portion of the MTC terminal determines priority for holding a buffer on the basis of the information on the configuration of the PDCCH for the MTC terminal. Moreover, when an overflow occurs, the buffer portion of the MTC terminal may also determine information to be flushed, on the basis of whether or not a parameter relating to the configuration of the MTC terminal is included.

When an overflow occurs, the buffer portion of the MTC terminal in the idle mode may preferentially hold the information on the configuration of the MTC terminal and flush any other information. For example, when the in formation on the configuration of the MTC terminal is set only to the MIB, the buffer portion may hold the MIB and flush other overflowed information. When the information on the configuration of the MTC terminal is set only to the SIB, the buffer portion may hold the SIB and flush other overflowed information.

When an overflow occurs, and if the information on the configuration of the MTC terminal is set to each of the MIB, SIB, and RRC message, the buffer portion of the MTC terminal in the connected mode may hold information on the configuration of the MTC terminal that is set to the RRC message, and flush any other overflowed information. When the information on the configuration of the MTC terminal is set only to a specific message, the buffer portion may preferentially hold the specific message, and flush any other overflowed information.

Regardless of the idle mode and the connected mode, the MTC terminal preferentially holds the information on the configuration of the PDCCH, in particular.

Next, a flow of uplink signal transmission and reception will be described. In the terminal device 1, a downlink reference signal extracted by the downlink reference signal extraction unit 604 is transmitted to the channel state measurement unit 608 under the instruction from the control unit 606, the channel state and/or interference is measured in the channel state measurement unit 608, and further CSI is calculated on the basis of the measured channel state and/or interference. The control unit 606 instructs the uplink control information generation unit 610 to generate an HARQ-ACK (DTX (not transmitted yet), ACK (detection succeeded), or HACK (detection failed)) and to map the HARQ-ACK to a downlink subframe on the basis of the determination result whether or not the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to RBs in an uplink subframe and an uplink subframe is generated.

An SC-FDMA signal is received by the SC-FDMA signal reception unit 509 via the receive antenna 508, and an SC-FDMA demodulation process is performed on the signal. In the uplink subframe processing unit 510, RBs to which the PUCCH is mapped are extracted by an instruction from the control unit 502, and, in the uplink control information extraction unit 511, the CSI included in the PUCCH is extracted. The extracted CSI is transmitted to the control unit 502. The CSI is used for control of downlink transmission parameters (MCS, downlink resource allocation, HARQ, and the like) by the control unit 502.

The base station device assumes maximum output power $P_{CMAX}$ configured by the terminal device from a power headroom report, and on the basis of the physical uplink channel received from the terminal device, assumes an upper limit value of the power for each physical uplink channel. The base station device determines, on the basis of these assumptions, a transmit power control command value for a physical uplink channel, and transmits the value to the terminal device on a PDCCH involving a downlink control information format. With these operations, power adjustment for the transmit power of the physical uplink channel transmitted from the terminal device is performed.

Note that, in the above-described embodiments, the power value required by each PUSCH transmission is described as being calculated on the basis of the parameters configured by a higher layer, an adjustment value determined on the basis of the number of PRBs allocated to the PUSCH transmission by resource assignment, downlink path loss and a coefficient by which the path loss is multiplied, an adjustment value determined on the basis of the parameter indicating the offset of the MCS applied to UCI, a value based on a TPC command, and the like. Moreover, the description is provided that the power value required by each PUCCH transmission is calculated on the basis of the parameter configured by a higher layer, downlink path loss, an adjustment value determined on the basis of the UCI transmitted by the PUCCH, an adjustment value determined on the basis of the PUCCH format, an adjustment value determined on the basis of the antenna port number used for the PUCCH transmission, the value based on the TPC command, and the like. However, the calculation of the power value is not limited to such a configuration. An upper limit value may be set for the required power value, and the smallest value of the value based on the above-described parameters and the upper limit value (e.g., $P_{CMAX,c}$, which is the maximum output power value of the serving cell c) may be used as the required power value.

A program running on each of the base station device 2 and the terminal device 1 according to the present invention may be a program (a program for causing a computer to operate) that controls a central processing unit (CPU) and the like in such a manner as to realize the functions according to the above-described embodiments of the present invention. The information handled in these devices is temporarily stored in a random access memory (RAM) while being processed. Thereafter, the information is stored in various types of read only memory (ROM) such as a flash ROM and a hard disk drive (HDD), and when necessary, is read by the CPU to be modified or rewritten.

Moreover, the terminal device 1 and the base station device 2 according to the above-described embodiments may be partially realized by the computer. This configuration may be realized by recording a program for realizing such control functions on a computer-readable recording medium and causing a computer system to read the program recorded on the recording medium for execution.

Note that the "computer system" is defined as a computer system built into the terminal device 1 or the base station device 2, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the above-described program may be configured to realize some of the functions described above, and additionally may be configured to be capable of realizing the functions described above in combination with a program already recorded in the computer system.

Furthermore, the base station device 2 according to the above-described embodiment can be realized as an aggregation (a device group) constituted of multiple devices. Devices constituting the device group may be each equipped with some or all portions of each function or each functional block of the base station device 2 according to the above-described embodiment. It is only required that the device group itself includes general functions or general functional blocks of the base station device 2. Furthermore, the terminal device 1 according to the above-described embodiments can also communicate with the base station device as the aggregation.

Furthermore, the base station device 2 according to the above-described embodiment may be an evolved universal terrestrial radio access network (EUTRAN). Furthermore, the base station device 2 according to the above-described embodiments may have some or all portions of the function of a node higher than an eNodeB.

Furthermore, some or all portions of each of the terminal device 1 and the base station device 2 according to the above-described embodiment may be realized as an LSI that is typically an integrated circuit or may be realized as a chip set. The functional blocks of the terminal device 1 and the base station device 2 may be individually realized as a chip, or some or all of the functional blocks may be integrated into a chip. Furthermore, a circuit integration technique is not limited to the LSI, and the integrated circuit may be realized with a dedicated circuit or a general-purpose processor. Furthermore, if with advances in semiconductor technology, a circuit integration technology with which an LSI is replaced appears, it is also possible to use an integrated circuit based on the technology. Furthermore, according to the above-described embodiments, a cellular mobile station device (cellular phone, portable terminal) is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

From, the above, the present invention provides the following characteristics.

(1) A terminal device according to one aspect of the present invention is a terminal device configured to communicate with a base station device, the terminal device including: a transmission unit configured to transmit capability information indicating that a first capability and a second capability are supported; and a reception unit configured to receive, via higher layer signalling, a first parameter corresponding to the first capability and a second parameter corresponding to the second capability. If the first parameter and the second parameter are configured, the transmission unit repeatedly transmits a physical uplink shared channel (PUSCH) and a physical uplink control channel (PUCCH) the same number of times with the same subframe.

(2) A terminal device according to one aspect of the present invention is the above-described terminal device. When the PUSCH and the PUCCH are transmitted in the same subframe, the transmission unit sets transmit power for the PUCCH with a prescribed power offset.

(3) A terminal device according to one aspect of the present invention is the above-described terminal device. When the PUCCH is not transmitted in the same subframe as that for the PUSCH, the transmission unit sets transmit power for the PUCCH without the prescribed power offset.

(4) A base station device according to one aspect of the present invention is a base station device configured to communicate with a terminal device, the base station device including: a reception unit configured to receive, from the terminal device, capability information indicating that a first capability and a second capability are supported; and a transmission unit configured to, when having a cell that allows for access from a terminal device supporting the capability information, transmit a first parameter corresponding to the first capability and a second parameter corresponding to the second capability via higher layer signalling. When having a cell that allows for access from a terminal device supporting the capability information, the transmission unit transmits a prescribed power offset for a physical uplink control channel (PUCCH) via higher layer signalling.

(5) A method according so one aspect of the present invention is a method of a terminal device configured to communicate with a base station device, the method including the steps of: transmitting capability information indicating that a first capability and a second capability are supported; receiving, via higher layer signalling, a first parameter corresponding to the first capability and a second parameter corresponding to the second capability; and if the first parameter and the second parameter are configured, repeatedly transmitting a physical uplink shared channel (PUSCH) and a physical uplink control channel (PUCCH) the same number of times with the same subframe.

(6) A method according to one aspect of the present invention is the above-described method, including the steps of: when the PUSCH and the PUCCH are transmitted in the same subframe, setting transmit power for the PUCCH with a prescribed power offset; and when the PUCCH is not transmitted in the same subframe as that tor the PUSCH, setting transmit power for the PUCCH without the prescribed power offset.

(7) A method according to one aspect of the present invention is a method of a base station device configured to communicate with a terminal device, the method including the steps of: receiving, from the terminal device, capability information indicating that a first capability and a second capability are supported; transmitting, when having a cell that allows for access from a terminal device supporting the capability information, a first parameter corresponding to the first capability and a second parameter corresponding to the second capability via higher layer signalling; and transmitting, when having a cell that for allows access from a terminal device supporting the capability information, a prescribed power onset for a physical uplink control channel (PUCCH) via higher layer signalling.

(8) A terminal device according to one aspect of the present invention is a terminal device configured to communicate with a base station device, the terminal device including a reception unit configured to receive a master information block (MIB) and one or more system information blocks (SIBs); and a transmission unit configured to transmit capability information indicating that the terminal device has a first capability. When a cell is indicated, by the MIB or the SIB, which the terminal device having the first capability is allowed to access and when information on a configuration of a physical downlink control channel (PDCCH) is included in the MIB or the SI message, the reception unit receives, from the cell, a PDCCH on the basis of resource allocution based on the information on the configuration of the PDCCH.

(9) A terminal device according to one aspect of the present invention is the above-described terminal device. The reception unit detects, from the PDCCH, a downlink control information (DCI) format involving cyclic redundancy check (CRC) scrambled with a first radio network temporary identifier (RNTI) and detects a paging channel (PCH) on the basis of resource allocation detected from the DCI format.

(10) A terminal device according to one aspect of the present invention is the above-described terminal device. The reception unit receives the first RNTI via higher layer signalling.

(11) A terminal device according to one aspect of the present invention is the above-described terminal device. When the information on the configuration of the PDCCH is not included in the MIB or the SIB, and when a second RNTI for a PCH is configured in information on a configuration of an enhanced PDCCH (EPDCCH), the reception unit detects, from the EPDCCH, a DCI format involving CRC scrambled with the second RNTI, and detects a PCH on the basis of the DCI format.

(12) A terminal device according to one aspect of the present invention is the above-described terminal device. When the information on the configuration of the PDCCH is not included in the MIB or the SIB, and when a second RNTI for a PCH is not configured in information on a configuration of an EPDCCH, and when the first capability information corresponds to downlink transmission bandwidth included in the MIB or the SIB, the reception unit detects, from a PDCCH allocated to the downlink transmission bandwidth, a DCI format involving CRC scrambled with a third RNTI which is a prescribed value, and detects a PCH on the basis of the DCI format.

(13) A terminal device according to one aspect of the present invention is the above-described terminal device. Resource allocation based on the configuration of the PDCCH is represented by a resource block index corresponding to the downlink transmission bandwidth indicated by the MIB or the SIB.

(14) A base station dev ice according to one aspect of the present invention is a base station device configured to communicate with a terminal device, the base station device including: a transmission unit configured to, when the terminal device indicates that a first capability is supported, transmit information indicating whether or not a cell that allows for access from the terminal device supporting the first capability is present, via higher layer signalling including system information. When a cell that allows for access from the terminal device supporting the first capability is present, the transmission unit sets, to a master information block or a system information block, information on a configuration of a physical downlink control channel (PDCCH) for the terminal device supporting the first capability.

(15) A base station device according to one aspect of the present invention is the above-described base station device. The transmission unit transmits, on the basis of a configuration of a PDCCH, a downlink control information (DCI) format involving cyclic redundancy check (CRC) scrambled with a first radio network temporary identifier (RNTI), and the first RNTI is an RNTI of a paging channel (PCH) for the terminal device supporting the first capability.

(16) A method according to one aspect of the present invention is a method of a terminal device configured to communicate with a base station device, the method including the steps of: receiving a master information block (MIB); receiving one or more system information blocks (SIBs); transmitting capability information indicating that the terminal device has a first capability; and receiving, when a cell is indicated, by the MIB or the SIB, which the terminal device having the first capability is allowed to access, and when information on a configuration of a physical downlink control channel (PDCCH) is included in the MIB or the SI message, a PDCCH from the cell on the basis of resource allocation based on the information on the configuration of the PDCCH.

(17) A method according to one aspect of the present invention is a method of a base station device configured to communicate with a terminal device, the method including the steps of: transmitting, when the terminal device indicates that a first capability is supported, information indicating whether or not a cell that allows for access from the terminal device supporting the first capability is present, via higher layer signalling including system information; and setting, when a cell that allows for access from the terminal device supporting the first capability is present, information on a configuration of a physical downlink control channel (PDCCH) for the terminal device supporting the first capability, to a master information block or a system information block.

(18) A terminal device according to one aspect of the present invention is a terminal device configured to communicate with a base station device, the terminal device including: a transmission unit configured to transmit, to the base station device, capability information indicating that a first capability is supported; and a reception unit configured to detect a master information block (MIB) from a physical broadcast channel (PBCH). If access from the terminal device supporting the first capability is allowed by the base station device, the reception unit detects, from the MIB, first information associated with downlink resource allocation for the terminal device supporting at least the first capability.

(19) A terminal device according to one aspect of the present invention is the above-described terminal device. The reception unit receives, on the basis of the first information, a physical downlink control channel (PDCCH) for the terminal device supporting at least the first capability.

(20) A terminal device according to one aspect of the present invention is the above-described terminal device. If cyclic redundancy check (CRC) is scrambled with a system information—radio network temporary identifier (SI-RNTI) in the PDCCH, the reception unit detects, from a physical downlink shared channel (PDSCH) corresponding to the PDCCH, system information for the terminal device supporting the first capability.

(21) A terminal device according to one aspect of the present invention is the above-described terminal device. A value of the SI-RNTI is a default value.

(22) A terminal device according to one aspect of the present invention is the above-described terminal device. The reception unit detects, from the system information, information on a configuration of a physical channel/physical signal for the terminal device supporting the first capability.

(23) A base station device according to one aspect of the present invention is a base station device configured to communicate with a terminal device, the base station device including: a transmission unit configured to set, to a master information block (MIB), first information associated with downlink resource allocation for a terminal device supporting at least a first capability and transmit the first information. The transmission unit transmits a physical downlink control channel (PDCCH) corresponding to the downlink resource allocation.

(24) A method according to one aspect of the present invention is a method of a terminal device configured to communicate with a base station device, the method including the steps of: transmitting, to base station device, capability information indicating that a first capability is supported; detecting a master information block (MIB) from a physical broadcast channel (PBCH); and detecting, from the MIB, if access from the terminal device supporting the first capability is allowed by the base station device, first information associated with downlink resource allocation for the terminal device supporting at least the first capability.

(25) A method according to one aspect of the present invention is a method of a base station device configured to communicate with a terminal device, the method including the steps of: setting, to a master information block (MIB), first information associated with downlink resource allocation for a terminal device supporting at least a first capability and transmitting the first information; and transmitting, when the downlink resource allocation is set to the MIB, a physical downlink control channel (PDCCH) corresponding to the downlink resource allocation.

(26) A terminal device according to one aspect of the present invention is a terminal device configured to communicate with a base station device, the terminal device including: a buffer portion configured to, when a first capability is supported, and when information on a configuration of a physical downlink control channel (PDCCH) for a terminal device having the first capability is included in a master information block (MIB), temporarily buffer the information on the configuration of the PDCCH. If an overflow occurs due to reception of a system information block (SIB), the buffer portion preferentially holds the information on the configuration of the PDCCH and flushes the overflowed SIB.

(27) A terminal device according to one aspect of the present invention is the above-described terminal device. If an overflow occurs due to reception of paging information, the buffer portion preferentially holds the information on the configuration of the PDCCH and flushes the overflowed paging information.

(28) A terminal device according to one aspect of the present invention is the above-described terminal device. When the information on the configuration of the PDCCH is included in the SIB, and if an overflow occurs due to reception of the MIB and the SIB, the buffer portion flushes the MIB.

(29) A terminal device according to one aspect of the present invention is the above-described terminal device. If an overflow occurs due to reception of paging information providing notification of a modification to the SIB and reception of the MIB and the paging information, the buffer portion flushes the MIB.

(30) A method according to one aspect of the present invention is a method of a terminal device configured to communicate with a base station device, the method including the steps of: temporarily buffering, when a first capability is supported and when information on a configuration of a physical downlink control channel (PDCCH) for a terminal device having the first capability is included in a master information block (MIB), the information on the configuration of the PDCCH; preferentially holding, if an overflow occurs due to reception of a system information block (SIB), the information on the configuration of the PDCCH; and flushing the overflowed SIB.

(31) A method according to one aspect of the present invention is the above-described method, including the steps of: preferentially holding, if an overflow occurs due to reception of paging information, the information on the configuration of the PDCCH; and flushing the overflowed paging information.

(32) A method according to one aspect of the present invention is the above-described method, including the step of flushing the MIB, when the information on the configuration of the PDCCH is included in the SIB, and if an overflow occurs due to reception of the MIB and the SIB.

(33) A method according to one aspect of the present invention is the above-described method, including the step of flushing the MIB, if an overflow occurs due to reception of paging information providing notification of a modification to the SIB and reception of the MIB and the paging information.

(34) A terminal device according to one aspect of the present invention is a terminal device configured to communicate with a base station device, the terminal device including: a reception unit configured to receive a higher layer signal including a configuration on a physical uplink shared channel (PUSCH); a scrambling sequence generator configured to, if the terminal device supports a capability relating to low complexity and/or coverage enhancement, apply the same scrambling sequence to a PUSCH during a certain period; and a transmission unit configured to transmit the PUSCH on the basis of the number of repetitions in the configuration relating to the PUSCH.

(35) A terminal device according to one aspect of the present invention is the above-described terminal device. The reception unit receives a higher layer signal including a configuration relating to a physical uplink control channel (PUCCH), and the transmission unit transmits the PUCCH on the basis of the number of repetitions in the configuration relating to the PUCCH.

(36) A terminal device according to one aspect of the present invention is the above-described terminal device. The reception unit receives a higher layer signal including a configuration relating to a physical random access channel (PRACH), and the transmission unit transmits the PRACH on the basis of the number of repetitions in the configuration relating to the PRACH.

(37) A base station device according to one aspect of the present invention is a base station device configured to communicate with a terminal device, the base station device including: a transmission unit configured to, if the terminal device supports a capability relating to low complexity and or coverage enhancement, configure a parameter relating to the number of repetitions to each of the configurations relating to a physical uplink shared channel, a physical uplink control channel, and a physical random access channel.

(38) A method according to one aspect of the present invention is a method of a terminal device configured to communicate with a base station device, the method including the steps of: receiving a higher layer signal including a configuration relating to a physical uplink shared channel (PUSCH); applying, if the terminal device supports a capability relating to low complexity and/or coverage enhancement, the same scrambling sequence to a PUSCH during a certain period; and transmitting the PUSCH on the basis of the number of repetitions in the configuration relating to the PUSCH.

(39) A method according to one aspect of the present invention is a method of a base station device configured to communicate with a terminal device, the method including the step of configuring, if the terminal device supports a capability relating to low complexity and/or coverage enhancement, a parameter relating to the number of repetitions to each of the configurations relating to a physical uplink shared channel, a physical uplink control channel, and a physical random access channel.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS

501 Higher layer
502 Control unit
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606 Control unit
607 Higher layer
608 Channel state measurement unit
609 Uplink subframe generation unit
610 Uplink control information generation unit
611, 612 SC-FDMA signal transmission unit
613, 614 Transmit antenna

The invention claimed is:

1. A terminal device comprising:
a receiver that receives a higher layer signal including information related to an enquiry for a capability of the terminal device;
a transmitter that transmits, in response to the enquiry, capability information including information indicating that the terminal device supports coverage enhancement, which is implemented by repeating transmission of physical uplink shared channel (PUSCH); and
a scrambling sequence generator configured to generate a scrambling sequence by initializing with an initial value, for the transmission of PUSCH, the initial value being determined by using a slot number, a physical cell identifier (PCI) and a radio network temporary identifier (RNTI), wherein
the receiver is further configured to receive, via higher layer signaling, configuration information, the configuration information indicating a number of repetitions of the scrambling sequence, the PCI and the RNTI;
the scrambling sequence generator is initialized with the initial value for every repetition of the scrambling sequence.

2. A method for a terminal, the method comprising:
receiving a higher layer signal including information related to an enquiry for a capability of the terminal device;
transmitting, in response to the enquiry, capability information including information indicating that the terminal device supports coverage enhancement, which is implemented by repeating transmission of physical uplink shared channel (PUSCH);
generating a scrambling sequence by a scrambling sequence generator initialized with an initial value, for transmission of PUSCH, the initial value being determined by using a slot number, a physical cell identifier (PCI) and a radio network temporary identifier (RNTI); wherein
the method further comprising receiving, via higher layer signaling, configuration information, the configuration information indicating a number of repetitions of the scrambling sequence, the PCI and the RNTI; and
the scrambling sequence generator is initialized with the initial value for every repetition of the scrambling sequence.

* * * * *